United States Patent
Dudar et al.

(10) Patent No.: US 11,333,112 B2
(45) Date of Patent: May 17, 2022

(54) METHOD AND SYSTEM FOR A VEHICLE EVAPORATIVE EMISSIONS CONTROL SYSTEM

(71) Applicant: Ford Global Technologies, LLC, Dearborn, MI (US)

(72) Inventors: Aed Dudar, Canton, MI (US); Robert Pyle, Canton, MI (US); Eric A. Macke, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/076,657

(22) Filed: Oct. 21, 2020

(65) Prior Publication Data
US 2022/0120245 A1    Apr. 21, 2022

(51) Int. Cl.
| | |
|---|---|
| F02M 35/08 | (2006.01) |
| F02M 25/08 | (2006.01) |
| B60G 17/00 | (2006.01) |
| G01S 19/42 | (2010.01) |
| G08G 1/00 | (2006.01) |
| G01C 21/36 | (2006.01) |
| F02M 35/02 | (2006.01) |
| F02M 35/024 | (2006.01) |
| G01C 21/34 | (2006.01) |
| B60K 15/03 | (2006.01) |
| B01D 46/71 | (2022.01) |

(Continued)

(52) U.S. Cl.
CPC .......... *F02M 35/086* (2013.01); *B01D 46/71* (2022.01); *B01D 46/76* (2022.01); *B60G 17/00* (2013.01); *B60K 15/03* (2013.01); *F02M 25/0836* (2013.01); *F02M 25/0872* (2013.01); *F02M 35/0204* (2013.01); *F02M 35/024* (2013.01); *G01C 21/3461* (2013.01); *G01C 21/3691* (2013.01); *G01S 19/42* (2013.01); *G08G 1/22* (2013.01); *B01D 2279/60* (2013.01); *B60K 2015/0321* (2013.01); *H04W 4/40* (2018.02)

(58) Field of Classification Search
CPC ............ F02M 35/086; F02M 35/0204; F02M 35/024; F02M 25/0836; F02M 25/0872; B01D 46/0068; B01D 46/0075; B01D 2279/60; B60G 17/00; B60K 15/03; B60K 2015/0321; G01C 21/3461; G01C 21/3691; G01S 19/42; G08G 1/22; H04W 4/40
USPC ....................................................... 123/519
See application file for complete search history.

(56) References Cited

U.S. PATENT DOCUMENTS

| | | | | |
|---|---|---|---|---|
| 4,622,996 A | * | 11/1986 | Gillingham | ........ B01D 46/0068 137/204 |
| 5,850,819 A | * | 12/1998 | Kunimitsu | ........... F02M 25/089 123/520 |

(Continued)

*Primary Examiner* — Mahmoud Gimie
(74) *Attorney, Agent, or Firm* — Geoffrey Brumbaugh; McCoy Russell LLP

(57) ABSTRACT

Methods and systems are provided herein for a dust box cleanout routine of an evaporative emissions control (EVAP) system of a vehicle. In one example, a method is provided for an engine of a vehicle, comprising, during travel on an unpaved road, selectively discharging a dust box housed in a vent line of an evaporative emissions control (EVAP) system by opening a discharge valve of the dust box leading to atmosphere. In this way, an accumulation of dust on the air filter and in the dust box of the EVAP system may be reduced, thereby maintaining an efficiency of the EVAP system.

18 Claims, 8 Drawing Sheets

(51) Int. Cl.
    *B01D 46/76*    (2022.01)
    *H04W 4/40*    (2018.01)

(56) References Cited

U.S. PATENT DOCUMENTS

| | | | |
|---|---|---|---|
| 5,858,034 A * | 1/1999 | Shida | B01D 46/0089 55/313 |
| 5,912,368 A * | 6/1999 | Satarino | B01D 45/08 55/320 |
| 6,260,935 B1 | 7/2001 | Abe et al. | |
| 6,546,954 B2 * | 4/2003 | Sato | F02M 25/0836 123/519 |
| 10,268,902 B2 | 4/2019 | Akiyama et al. | |
| 2010/0293904 A1 * | 11/2010 | Lin | B01D 50/002 55/318 |
| 2015/0027311 A1 * | 1/2015 | Link | F02M 35/10255 95/279 |

* cited by examiner

METHOD AND SYSTEM FOR A VEHICLE EVAPORATIVE EMISSIONS CONTROL SYSTEM

FIELD

The present description relates generally to methods and systems for an evaporative emissions control system of a vehicle, and more specifically, to a dust box cleanout routine of the evaporative emissions control system.

BACKGROUND/SUMMARY

Vehicles may be fitted with evaporative emissions control (EVAP) systems such as onboard fuel vapor recovery systems. Such systems capture and reduce release of vaporized hydrocarbons to the atmosphere, for example, fuel vapors released from a vehicle gasoline tank during refueling. Specifically, the vaporized hydrocarbons (HCs) are stored in a fuel vapor canister packed with an adsorbent which adsorbs and stores the vapors. At a later time, when the engine is in operation, the evaporative emissions control system allows the vapors to be purged into an engine intake manifold. During a vapor purge routine, a canister purge valve and a canister vent valve of the EVAP system may be opened, whereby an engine vacuum may generate an air flow that draws fresh air through the canister vent valve, the vapor canister, and the canister purge valve into the engine intake manifold, thereby desorbing the hydrocarbons and purging the canister. The canister vent valve may include an air filter, and dust particles that collect on the air filter may detach and be captured by a dust box surrounding the air filter. The air filter may block dust particles from entering and negatively impacting a functional performance of the vapor canister. For example, dust that enters the vapor canister may increase a restriction of the canister, which can degrade system performance and increase vacuum levels in the system, and may further cause the canister vent valve to leak, thereby increasing evaporative emissions.

However, the inventors herein have recognized a potential issue with such methods. In particular, the inventors have recognized that for vehicles that operate frequently on dirt roads or in dusty environments, while operating in such environments, if the canister is purged, the dust box can be overwhelmed with a large amount of dust which may restrict a flow of air into the EVAP system, thereby reducing an efficiency of the EVAP system. Further, the restricted flow of air into the EVAP system may cause premature shut-offs during refueling events, as well as an increase in evaporative emissions.

In one example, the issues described above may be addressed by a method for an engine of a vehicle, comprising, during travel on an unpaved road, selectively discharging a dust box housed in a vent line of the EVAP system by opening a discharge valve of the dust box leading to atmosphere. Additionally, a pressure generated in the EVAP system may be expelled through the air filter to discharge dust from the filter into the dust box. The discharge of dust may be aided by turning on an active suspension of the vehicle, whereby vibrations in the air filter may be generated that cause dust particles to be released from the filter. Further, in some examples, a controller of the vehicle may identify and route the vehicle to an unpaved road in order to discharge the dust box. In this way, an accumulation of dust on the air filter and in the dust box of the EVAP system may be opportunistically reduced, thereby maintaining an efficiency of the EVAP system.

As an example, a controller of the vehicle may anticipate an operation of the vehicle on an unpaved road, based on information from one or more remote sources including, for example, GPS mapping, V2V networks, and/or V2X networks. Prior to operation on the unpaved road, a vapor purge control routine may be turned off and a canister vent valve may be closed, thereby sealing the EVAP system. A pressure increase may be generated in the EVAP system due to a rising external temperature or temperature of the vehicle, and an active suspension system may be turned on to induce vibrations in the EVAP system, thereby releasing dust particles from the filter into the dust box. When it is determined that the vehicle is operating on an unpaved road (e.g., via onboard cameras, onboard navigation system, etc.), the canister vent valve may be opened, thereby releasing pressurized air through the air filter and expelling dust from the filter into the dust box. An electromechanical valve of the dust box may be actuated to an open position, whereby dust from the dust box may be discharged into the atmosphere.

In this way, a dust box cleanout routine may reduce an accumulation of dust on the filter and in the dust box, thereby maintaining an efficiency of the EVAP system and reducing emissions by increasing a flow of air for desorption. Also, premature refueling system shut-offs during refueling may be reduced. A technical advantage of the dust box cleanout routine is that a restriction of the flow of air through the vapor canister during a vapor canister purge routine caused by dust may be reduced, thereby reducing foreign contamination and/or leaks in one or more downstream purge valves, vapor blocking valves, CVS, etc. An additional advantage of the dust box cleanout routine is that the dust may be discharged at a desirable location (e.g., on an unpaved road), whereby a contamination of an urban environment or a paved road may be averted. Further, a capacity of the dust box and a size of the filter may be reduced, decreasing a cost of the EVAP system and providing additional design margin. Overall, by opportunistically purging the dust box when the vehicle is operating on a dirt road, an efficiency of the engine system of the vehicle may be maintained and servicing trips may be reduced.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
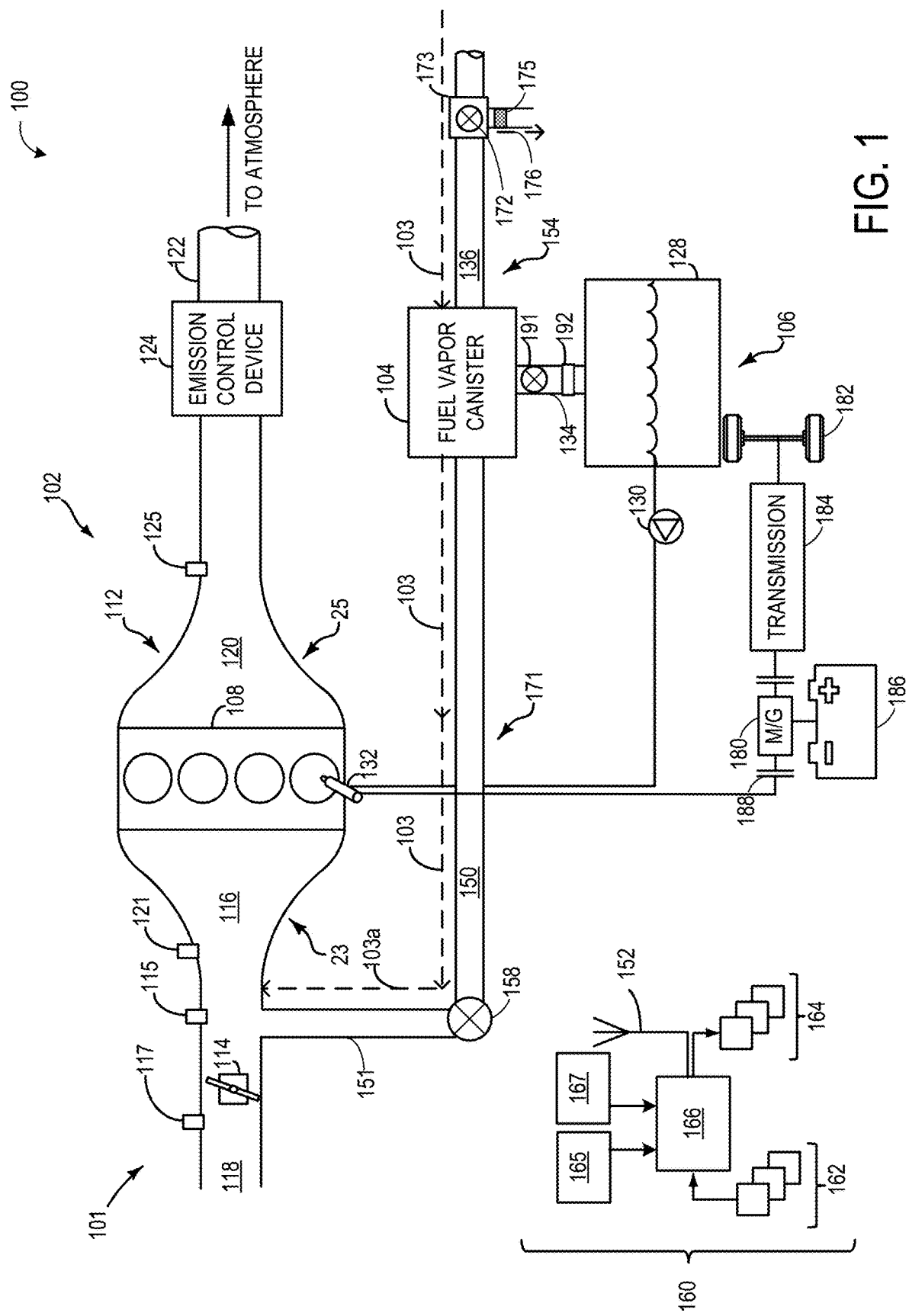
FIG. 1 shows an example vehicle system with an engine system, a fuel system, and an EVAP system.
Figure 2:
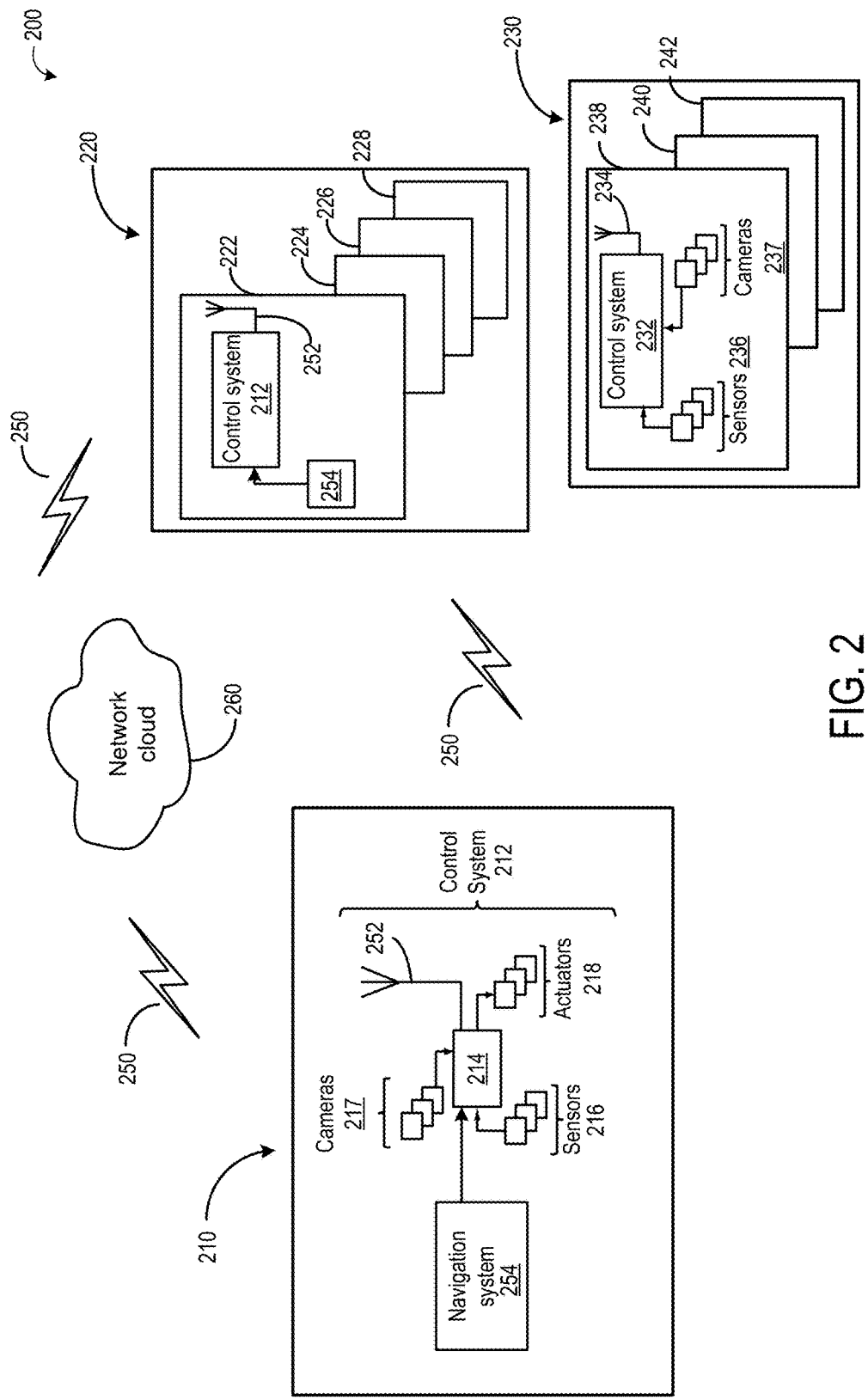
FIG. 2 shows an example embodiment of a vehicle system comprising a navigation system, in communication with an external network and a fleet of vehicles.
Figures 3A, 3B:
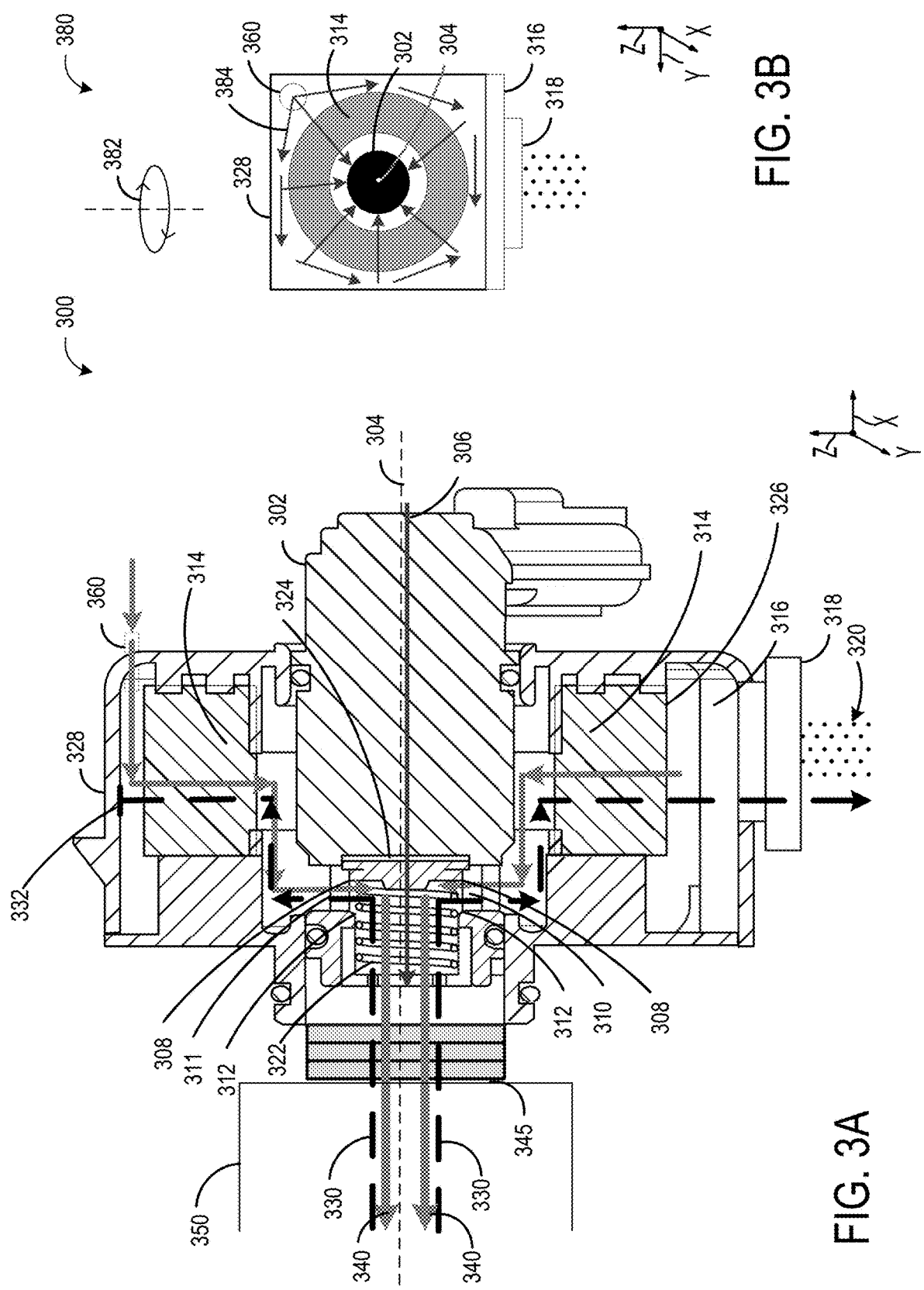
FIG. 3A shows a cross-sectional view of an example dust box of an EVAP system.
FIG. 3B shows a side view of the example dust box of an EVAP system pf FIG. 3A.
Figure 5:
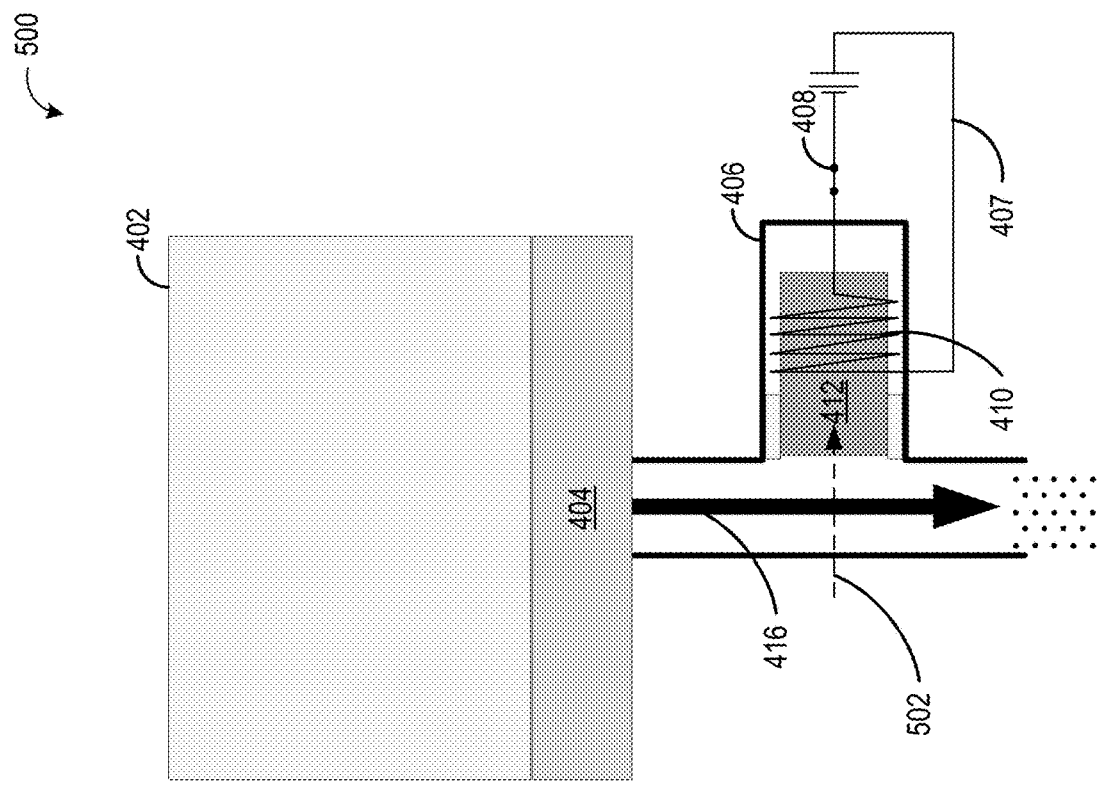
FIG. 5 shows an example discharge valve mechanism for a dust box in an open position.
Figure 6:
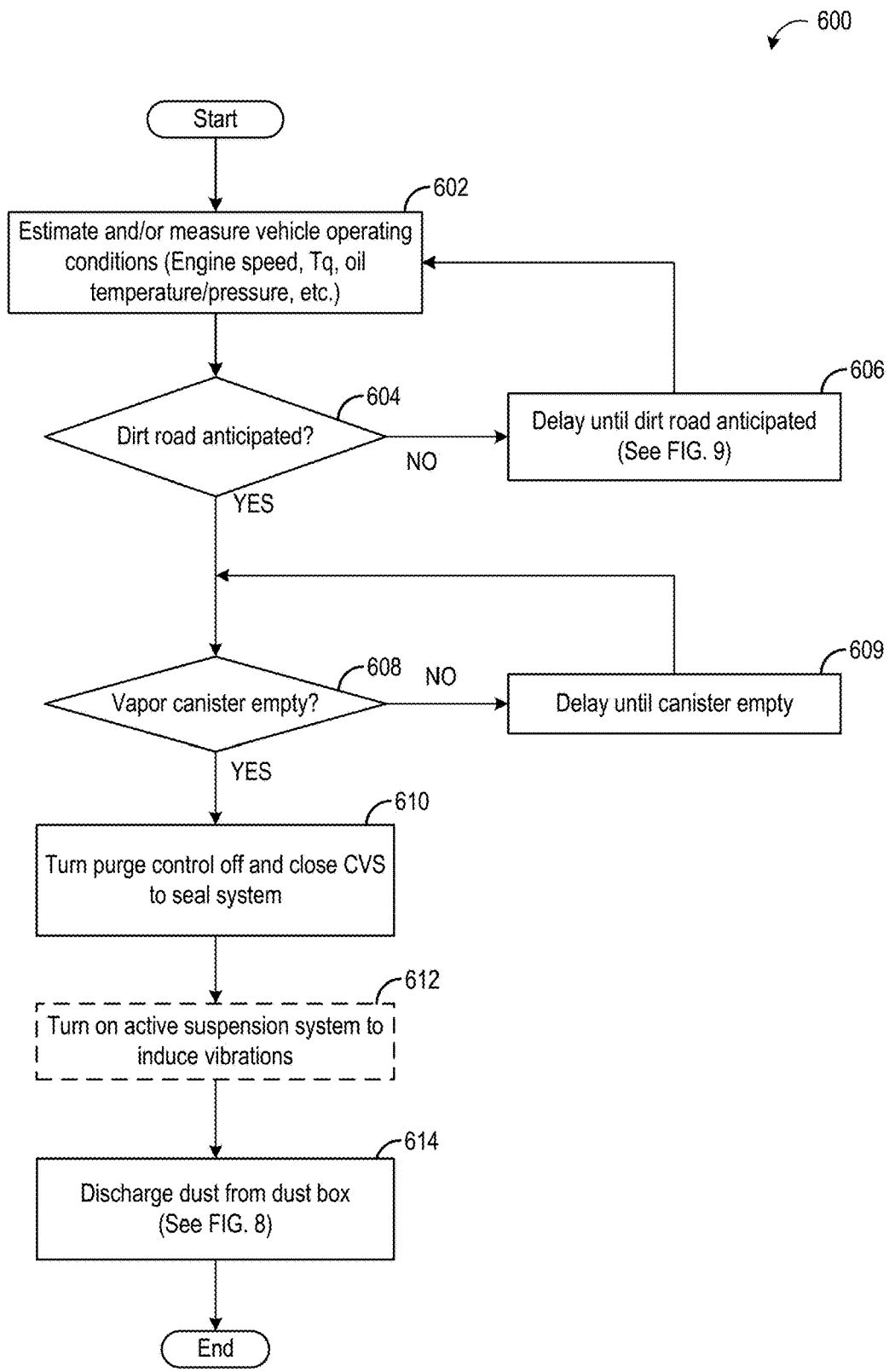
FIG. 6 is a flowchart illustrating an example method for a dust box cleanout routine for EVAP system.
Figure 7:
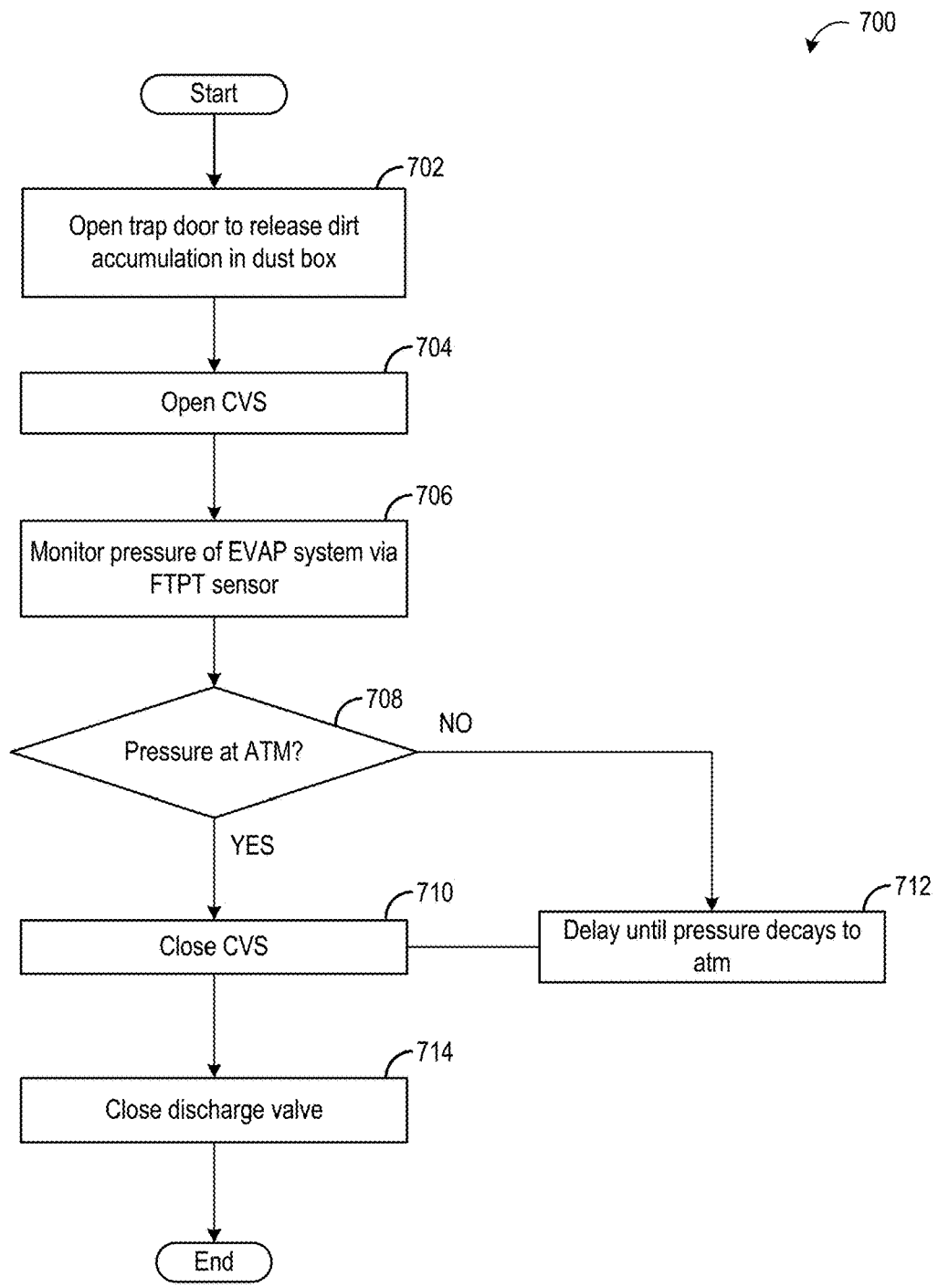
FIG. 7 is a flowchart illustrating an example method for discharging a dust box of an EVAP system.
Figure 8:
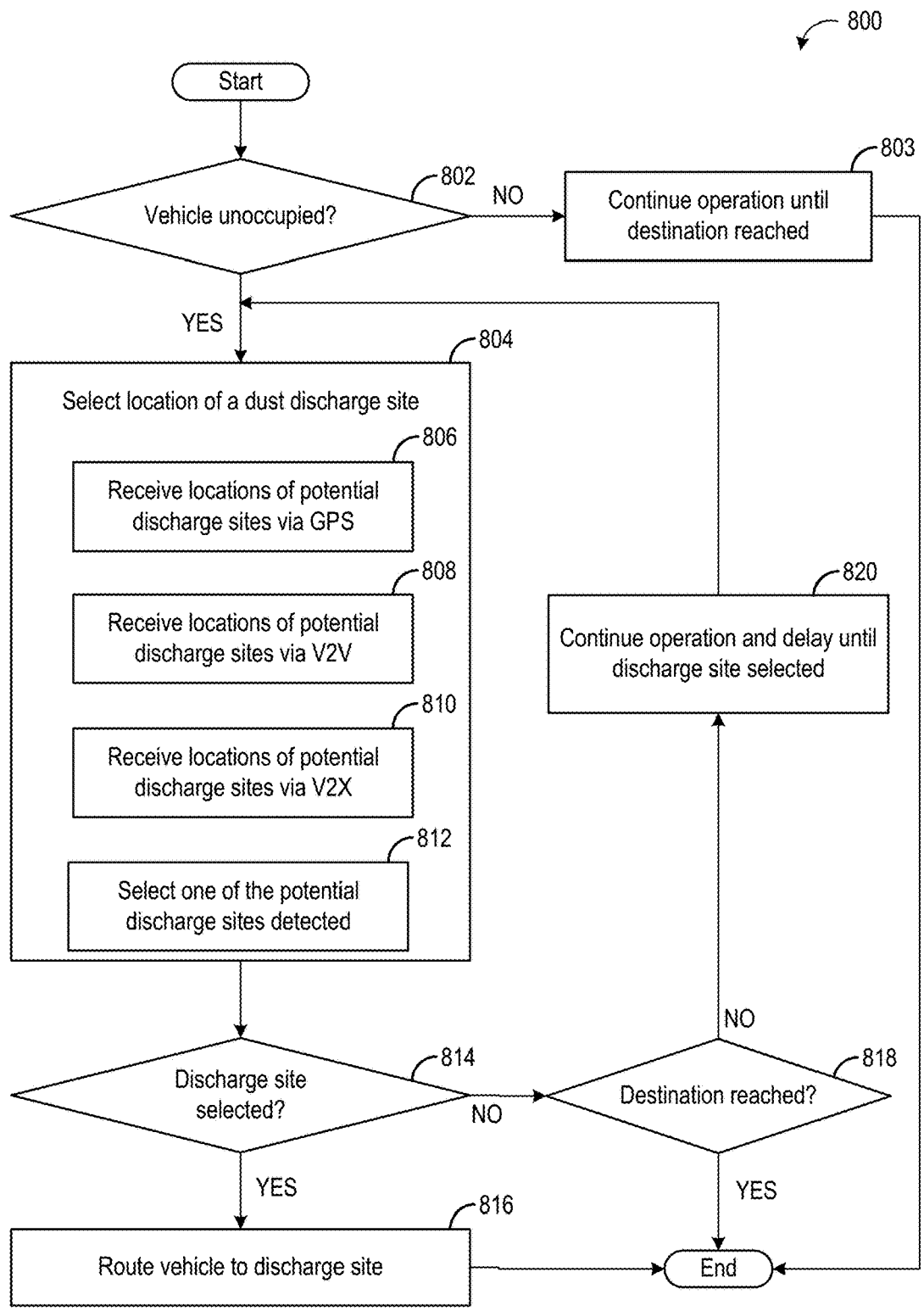
FIG. 8 is a flowchart illustrating an example method for routing an autonomous vehicle to a location for discharging a dust box.

An example propulsion system of a vehicle is depicted in FIG. 1, including an engine system, an evaporative emissions control (EVAP) system, and a fuel system. The EVAP system may include a canister vent valve (CVS) and an air filter housed inside a dust box, as shown in FIGS. 3A and 3B. A controller of the vehicle may determine a suitable location for discharging the dust box by using an onboard navigation system and/or communicating with a network cloud, a vehicle-to-vehicle (V2V) communication system, and/or a vehicle-to-infrastructure (V2X) communication system, as shown in FIG. 2. The dust box may be discharged by opening a discharge valve actuated by a solenoid, as shown in a closed configuration in FIG. 4 and in an open configuration in FIG. 5. Dust may be discharged from the dust box via a method for a dust box cleanout routine, as shown in FIG. 6. The dust box cleanout routine may include a method for discharging dust from a dust box, as shown by FIG. 7. For an autonomous vehicle, the dust box cleanout routine may include a method for routing the vehicle to a suitable location to discharge the dust box, as shown by FIG. 8. The dust box cleanout routine may be performed by executing a sequence of operations, as exemplified by the operational sequence shown by FIG. 9.

Turning to the figures, FIG. 1 shows a schematic depiction 100 of a vehicle system 101, which includes an engine system 102 coupled to an EVAP system 154 and a fuel system 106. The engine system 102 may include an engine 112 having a plurality of cylinders 108. The engine 112 includes an engine intake 23 and an engine exhaust 25. The engine intake 23 includes an intake passage 118 and a throttle 114 fluidly coupled to the engine intake manifold 116. The engine exhaust 25 includes an exhaust manifold 120 leading to an exhaust passage 122 that routes exhaust gas to the atmosphere. The engine exhaust 122 may include one or more emissions control devices 124, which may be mounted in a close-coupled position in the exhaust. One or more emissions control devices may include a three-way catalyst, lean NOx trap, diesel particulate filter, oxidation catalyst, etc. It will be appreciated that other components may be included in the vehicle system, such as a variety of valves and sensors, as further elaborated below.

Fuel system 106 may include a fuel tank 128 coupled to a fuel pump system 130. The fuel pump system 130 may include one or more pumps for pressurizing fuel delivered to fuel injectors 132 of engine 112. While only a single fuel injector 132 is shown, additional injectors may be provided for each cylinder. For example, engine 112 may be a direct injection gasoline engine and additional injectors may be provided for each cylinder. It will be appreciated that fuel system 106 may be a return-less fuel system, a return fuel system, or various other types of fuel system. In some examples, a fuel pump may be configured to draw the tank's liquid from the tank bottom. Vapors generated in fuel system 106 may be routed to EVAP system 154, described further below, via conduit 134, before being purged to the engine intake 23.

EVAP system 154 includes a fuel vapor retaining device, depicted herein as fuel vapor canister 104. Canister 104 may be filled with an adsorbent capable of binding large quantities of vaporized HCs. In one example, the adsorbent used is activated charcoal. Canister 104 may receive fuel vapors from fuel tank 128 through conduit 134. While the depicted example shows a single canister, it will be appreciated that in alternate embodiments, a plurality of such canisters may be connected together. Canister 104 may communicate with the atmosphere through vent 136. A canister vent valve (also referred herein as canister vent solenoid or CVS) 172 may be located along vent 136, coupled between the fuel vapor canister and the atmosphere, and may adjust a flow of air and vapors between canister 104 and the atmosphere. In one example, operation of CVS 172 may be regulated by a solenoid. For example, based on whether the canister is to be purged or not, the CVS 172 may be opened or closed.

Conduit 134 may include a fuel tank isolation valve 191. Among other functions, fuel tank isolation valve 191 may allow the fuel vapor canister 104 to be maintained at a low pressure or vacuum without increasing the fuel evaporation rate from the tank (which would otherwise occur if the fuel tank pressure were lowered). The fuel tank 128 may hold a plurality of fuel blends, including fuel with a range of alcohol concentrations, such as various gasoline-ethanol blends, including E10, E85, gasoline, etc., and combinations thereof. Conduit 134 may also include a fuel tank pressure transducer (FTPT) 192, which may measure a pressure of the fuel tank 128 and/or a pressure of the EVAP system 154. For example, the FTPT 192 may monitor the pressure of the EVAP system 154 to determine whether a positive pressure of the EVAP system 154 has decayed to atmosphere after the CVS 172 is opened, as part of a dust box cleanout routine described in greater detail below in reference to FIGS. 7 and 8.

Fuel vapor recovery system 154 may include a fuel vapor purge system 171. Purge system 171 is coupled to canister 104 via a conduit 150. Conduit 150 may include a canister purge valve (CPV) 158 disposed therein. Specifically, CPV 158 may regulate the flow of vapors along duct 150. The quantity and rate of vapors released by CPV 158 may be determined by the duty cycle of an associated CPV solenoid (not shown). In one example, the duty cycle of the CPV solenoid may be determined by a controller 166 responsive to engine operating conditions, including, for example, an air-fuel ratio. By commanding the CPV 158 to be closed, the controller may seal the fuel vapor canister from the fuel vapor purging system, such that no vapors are purged via the fuel vapor purging system. In contrast, by commanding the CPV 158 to be open, the controller may enable the fuel vapor purging system to purge vapors from the fuel vapor canister.

Fuel vapor canister 104 operates to store vaporized hydrocarbons (HCs) from fuel system 106. Under some operating conditions, such as during refueling, fuel vapors present in the fuel tank may be displaced when liquid is added to the tank. The displaced air and/or fuel vapors may be routed from the fuel tank 128 to the fuel vapor canister 104, and then to the atmosphere through vent 136. In this way, an increased amount of vaporized HCs may be stored in fuel vapor canister 104. During a later engine operation, the stored vapors may be released back into the incoming air charge via fuel vapor purging system 171.

A first purge conduit 151 connects conduit 150 to engine intake 23 downstream of throttle 114. The fuel vapor purging system 171 may be operated to purge fuel vapors from the canister 104 to the engine 112 during natural aspiration.

During naturally aspirated operation of the engine, the engine intake manifold may be under vacuum conditions. For example, intake manifold vacuum conditions may be present during an engine idle condition, with manifold pressure below atmospheric pressure by a threshold amount. The intake manifold vacuum may allow fluidic communication between the canister 104 and the intake manifold 116 via the conduit 150, CPV 158, and the first purge conduit 151. This vacuum in the intake system 23 may draw fuel vapor from the canister through conduits 150 and first purge conduit 151 into intake manifold 116, as represented by dashed line(s) 103 and 103a.

Vehicle system 101 may further include a control system 160. Control system 160 is shown receiving information from a plurality of sensors 162 (various examples of which are described herein) and sending control signals to a plurality of actuators 164 (various examples of which are described herein). As one example, sensors 162 may include an exhaust gas sensor 125 (located in exhaust manifold 120) and various temperature and/or pressure sensors arranged in intake system 23, for example, a pressure or airflow sensor 115 in intake conduit 118 downstream of throttle 114, and/or a pressure or air flow sensor 117 in intake conduit 118 upstream of throttle 114. Other sensors such as additional pressure, temperature, air/fuel ratio, and composition sensors may be coupled to various locations in the vehicle system 101. As another example, actuators 164 may include fuel injectors 132, throttle 114, a fuel pump of pump system 130, etc. The control system 160 may include an electronic controller 166. The controller may receive input data from the various sensors, process the input data, and trigger the actuators in response to the processed input data based on instructions or code programmed therein corresponding to one or more routines.

The electric controller 166 may include non-transitory computer readable medium (memory) in which programming instructions are stored, and may be programmed with computer readable data representing instructions executable to perform the methods described below, as well as other variants that are anticipated but not specifically listed. Memory as referenced herein may include volatile and non-volatile or removable and non-removable media for a storage of electronic-formatted information such as computer readable instructions or modules of computer readable instructions, data, etc. Examples of computer memory may include, but are not limited to RAM, ROM, EEPROM, flash memory, or any other medium which can be used to store the desired electronic format of information and which can be accessed by the processor or processors or at least a portion of a computing device.

The control system 160 may include a global positioning system (GPS) navigation system 165, which may determine a location of the vehicle at key-on and at any other instant of time. The control system 160 may include an active suspension system 167, whereby the vehicle may control a vertical movement of one or more wheels of the vehicle relative to the chassis to dampen bumps and/or vibrations in a road. In one example, the active suspension system 167 may be turned on to induce a vibration of elements of the EVAP system, for example, to dislodge particles of dust from an air filter of the EVAP system. In another example, a state of the active suspension system 167 may be used to determine a condition of a road that the vehicle is operating on (e.g., whether the road is paved). The control system 160 may also include a wireless communication device 152 for direct communication of the vehicle with a network cloud. For example, the network cloud may include a vehicle-to-vehicle (V2V) network, a vehicle-to-infrastructure (V2X) network, one or more remote servers, etc. As described in greater detail below in relation to FIG. 2, by using the wireless communication device 152, the vehicle may retrieve ambient condition data such as temperature, pressure, particulate matter in the atmosphere (e.g., dust) etc., from the network cloud. In some examples, the onboard navigation system 165 and the wireless communication device 152 may be used together, to estimate a road and/or atmospheric condition of a planned route. In one example, the onboard navigation system 165 may be a global positioning system (GPS). For example, the controller 166 may use the onboard navigation system 165 and the wireless communication device 152 to determine whether a planned route includes a dirt road, based on location data from the onboard navigation system 165 and road condition data from other vehicles within a V2V network, or from infrastructure via a V2X network.

In some examples, the CVS 172 may be housed inside a dust box 173 disposed upstream of the vapor canister 104. The dust box 173 may include an air filter to filter air entering the vapor canister 104 during a purge routine. For example, when the vehicle is operating on a dirt road or in a dusty environment, dust may be drawn into the evaporative control system via the CVS 172 by a vacuum induced in the engine intake 116, as described above. The air filter may filter out the dust, thereby blocking the dust from entering the vapor canister 104. Dust that collects on a surface of the air filter and inside the dust box 173 may be periodically purged via a dust box cleanout routine, whereby the dust may be discharged via an electromechanical discharge valve 175 of the dust box 173. In one example, the discharge valve 175 is opened via a solenoid actuated by the controller 166. When the discharge valve 175 is opened, dust may be discharged from the dust box 173 in a downward direction by a force of gravity, as indicated by the arrow 176.

For example, dust from operating the vehicle on a dusty road may collect in the dust box 173. When the dust in the dust box 173 reaches a threshold dust level, a dust box cleanout routine may be initiated whereby when a desirable location is reached (e.g., a non-paved road), a controller 166 actuates the discharge valve 175 to an open position, thereby allowing the dust to fall out of the discharge valve 175. In one example, when the discharge valve 175 is opened, the dust is released through the discharge valve by force of gravity. In other examples, the dust is expelled through the discharge valve by a pressure of the EVAP system. For example, the EVAP system may be sealed for a duration prior to discharging the dust box to create a pressure buildup in the EVAP system as a result of an increase in ambient temperature and/or temperature of the vehicle, or (e.g., from operating the engine 112). In still other examples, the dust is expelled by a combination of gravity and a pressure in the EVAP system. Details of a method to opportunistically clean the dust box are described in greater detail below in relation to FIGS. 6 and 7.

In some examples (e.g., when the vehicle is an autonomous vehicle), the vehicle may deliberately operate on a dirt road to generate vibrations to expedite release of stuck particles of dust in the dust box 173. In other examples, an active suspension system 167 may be turned on prior to opening the discharge valve to couple road feedback to the vehicle frame, thereby inducing vibrations that may shake dust from the filter into the dust box 173.

Diagnostic tests may be periodically performed on the EVAP system 154, fuel system 106, and the fuel vapor purge system 171 in order to indicate the presence or absence of undesired evaporative emissions.

In some examples, vehicle system 101 may be a hybrid vehicle system with multiple sources of torque available to one or more vehicle wheels 182. In other examples, vehicle system 101 is a conventional vehicle with only an engine, or an electric vehicle with only electric machine(s). In the example shown, vehicle system 101 includes engine 112 and an electric machine 180. Electric machine 180 may be a motor or a motor/generator. Crankshaft of engine 112 and electric machine 180 are connected via a transmission 184 to vehicle wheels 182 when one or more clutches 188 are engaged. In the depicted example, a first clutch 188 is provided between crankshaft and electric machine 180, and a second clutch 188 is provided between electric machine 180 and transmission 184. Controller 12 may send a signal to an actuator of each clutch 188 to engage or disengage the clutch, so as to connect or disconnect crankshaft 140 from electric machine 180 and the components connected thereto, and/or connect or disconnect electric machine 180 from transmission 184 and the components connected thereto. Transmission 184 may be a gearbox, a planetary gear system, or another type of transmission. The powertrain may be configured in various manners including as a parallel, a series, or a series-parallel hybrid vehicle.

Electric machine 180 receives electrical power from a traction battery 186 to provide torque to vehicle wheels 182. Electric machine 180 may also be operated as a generator to provide electrical power to charge battery 186, for example during a braking operation.

Referring now to FIG. 2, an example embodiment 200 of a vehicle system 210 in communication with an external network (cloud) 260, a fleet of vehicles 220, and one or more infrastructure elements 230 is shown. The vehicle system 210 may include a vehicle control system 212 with a controller 214. A navigation system 254 may be coupled to the control system 212 to determine location of the vehicle 210 at key-on and at any other instant of time. At a vehicle key-off, the last location (e.g., GPS co-ordinates of the vehicle) of the vehicle 210 as estimated by the navigation system 254 may be stored by the control system 212 for use during the next key-on event. The navigation system may be connected to a network cloud 260 via wireless communication 250. The controller 214 may be coupled to a wireless communication device 252 for direct communication of the vehicle 210 with a network cloud 260. Using the wireless communication device 252, the vehicle 210 may retrieve data from the network cloud 260. For example, the network cloud 260 may include one or more remote servers from which the vehicle 210 may retrieve ambient condition data (such as weather, temperature, particulate matter in the air, etc.) for a location of the vehicle. In one example, the controller 214 may use the navigation system 254 to determine a current location of the vehicle 210 and obtain the ambient condition data for that location from the network cloud 260. In other examples, the controller 214 may use the navigation system 254 to determine a route of the vehicle 210 and obtain the ambient condition data for an upcoming location on the route from the network cloud 260. In one example, the ambient condition data may include an estimate of an amount of particulate matter in the air (e.g., dust).

For example, when purging a vapor canister of the vehicle 210, fresh air is drawn into a CVS (e.g., the CVS valve 172 of FIG. 1) of an EVAP system of the vehicle in a first direction. When the vehicle 210 is operating on unpaved or dusty roads, a flow of the fresh air may become restricted due to an accumulation of dust on an air filter and in a dust box of the CVS, thereby reducing an efficiency of the EVAP system. As a result, a controller of the vehicle may carry out a dust box cleanout routine, whereby a discharge valve of the dust box is opened and air from the EVAP system is expelled through the CVS and the air filter in a second direction, opposite to the first direction, to discharge the dust from the air filter and dust box. The dust box cleanout routine may include determining a suitable location for discharging the dust from the dust box, where dust is already present in the environment (e.g., an unpaved road). In one example, determining a suitable location for discharging the dust includes receiving information about unpaved roads in a vicinity of the vehicle 210 and/or planned routes of the vehicle from one or more sources, including remote sources in the network cloud 260, such as an external server with map information that may be used in conjunction with the onboard navigation system 254. If the controller 214 determines that a planned route of the vehicle 210 involves operation on an unpaved road, based on the information received from the network cloud 260, the controller may initiate a dust box discharge routine. Initiating the dust box discharge routine may include, for example, sealing the EVAP system of the vehicle 210 in order to generate a pressure increase in the EVAP system, and/or turning on an active suspension of the vehicle 210 to induce vibrations in the dust box (e.g., to shake dust off the filter). The controller 214 may use the onboard navigation system 254 to determine when the vehicle 210 has reached the section of unpaved road, where the dust box discharge routine may include discharging the dust on the unpaved road. An example dust box discharge routine is described in greater detail below in reference to FIGS. 6 and 7.

Control system 212 is shown receiving information from a plurality of sensors 216 and/or a plurality of onboard cameras 217 and sending control signals to a plurality of actuators 218. As one example, sensors 216 may include manifold absolute pressure intake air temperature (IAT) sensor, outside air temperature (OAT) sensor, (MAP) sensor, barometric pressure (BP) sensor, fuel tank pressure sensor, canister temperature sensor, etc. The onboard cameras 217 may include one or more external cameras (e.g., cameras installed on a front, rear, or side of the vehicle), and one or more internal cameras (e.g., installed in a cabin of the vehicle, or on a dashboard of the vehicle. Operations of the engine and/or EVAP system may be regulated based on signals received from the different sensors 216 and/or the different onboard cameras 217, whereby the controller 214 may send control signals to one or more actuators 218. The actuators 218 may include, for example, one or more valves of the EVAP system such as a CVS, CPV, FTIV, etc. In one example, the controller 214 may send control signals to an actuator for closing a CVS and an actuator for closing a discharge valve of a dust box of a CVS filter system in response to a signal from a fuel tank pressure sensor indicating pressure at atmosphere, from which it may be inferred that a dust box cleanout routine has ended. In another example, the controller 214 may initiate the dust box cleanout routine responsive to a determination that the vehicle is operating on an unpaved, dirt road, where the determination is based on detecting dust in an image generated by an external camera mounted on the rear of the vehicle.

A fleet 220 of vehicles is shown is shown in FIG. 2. A fleet 220 may comprise of multiple vehicles 222, 224, 226, and 228. In one example, vehicles 222-228 may each be similar in make and model to the vehicle 210. In other examples, vehicles 222-228 may be vehicles within a threshold distance of vehicle 210. Further still, vehicles 222-228 may be vehicles that are part of a common fleet as vehicle 210. Each vehicle of the fleet 220 may comprise a control system 212 similar to the control system 212 of vehicle 210. A navigation system 254 and a wireless communication device 252 may be coupled to the control system 212 of each vehicle in the fleet 220. The on-board controllers in the vehicles in the fleet may communicate with each other and to the on-board controller in vehicle 210 via their respective navigation system 254, via wireless communication device 252, and/or via other forms of vehicle to vehicle technology (V2V). The vehicles in the fleet 220 may also communicate with the network cloud 260 via wireless communication 250.

The vehicle 210 may retrieve ambient (such as temperature, air quality, etc.) conditions from one or more vehicles in the fleet 220, where the one or more vehicles in the fleet 220 are within a threshold radius of the vehicle 210 and ahead of the vehicle 210 on a planned route. For example, the threshold radius may be a range of the wireless communication device 252, or the threshold radius may be a shorter distance than the range of the wireless communication device 252, or the threshold distance may be a function of a speed of the vehicle 210 (e.g., a predetermined duration multiplied by a speed of the vehicle 210).

As one example, the vehicle 210 may be operating at a first location on a paved road along an estimated route, where the estimated route is a route estimated by the controller 214 based on GPS mapping information accessed by the onboard navigation system 254, historical information of the vehicle and/or operator, and/or other information. In one example, the estimated route may be a route planned by an operator of the vehicle 210 using the onboard navigation system 254. In another example, the estimated route may be a continuation of a present course, where no options are provided for departing from the course (e.g., on a highway between exits). In still another example, the estimated route may be a route estimated based on the operator's historical driving data. For example, one or more frequently travelled routes of the operator may be stored in a memory of the controller and/or in a remote GPS service. As an example, based on the starting location and a time of start of a drive cycle, the controller may determine when the operator is driving on one frequently travelled route of the one or more frequent routes. It should be appreciated that the examples provided herein are for illustrative purposes, and other ways of determining an estimated route of the vehicle 210 may be used without departing from the scope of this disclosure.

A vehicle of the fleet 220 may be operating at a second location on the paved road, where the second location is also on the estimated route of the vehicle 210, and the second location is ahead of the vehicle 210. The paved road may include an unpaved section, for example, due to a construction project on the paved road, which the vehicle of the fleet 220 may encounter prior to the vehicle 210. The vehicle of the fleet 220 may detect a change of a state of the road from a paved road to a dirt road. In one example, the controller 214 detects the unpaved road via an onboard dust sensor (e.g., laser, infrared, optical, etc.). In other examples, the controller 214 may detect the unpaved road via camera imaging. For example, an onboard camera positioned at the back or side of the vehicle 210 may be used to capture images of the road with the vehicle when stopped and when the vehicle accelerates. If the image becomes fuzzy upon the acceleration event, it may be inferred that the vehicle 210 is operating on a dirt road. In still other examples, a detection or corroboration of an unpaved road may involve detecting a slippage of one or more wheels of the vehicle 210 by an anti-lock braking system (ABS), and/or an increased bumpiness of the road via an active suspension system.

Upon detecting the change of the road from a paved road to an unpaved road, the vehicle of the fleet 220 may transmit the change of the state of the road to the vehicle 210 via the wireless communication device 252. Upon receiving the information regarding the change of the state of the road from a paved road to an unpaved road in an upcoming section of the planned route, the controller 214 of the vehicle 210 may initiate the dust box cleanout routine of the EVAP system, whereby a vapor purge control is turned off and the EVAP system is sealed, in preparation for purging the dust box and discharging dust from the dust box onto the section of unpaved road (e.g., which is already dusty). The controller 214 may turn on an active suspension system of the vehicle 210, which may induce vibrations in the EVAP system, whereby dust accumulated on a filter of the dust box may be dislodged and/or released into the dust box.

Upon reaching the section of unpaved road, the controller 214 of the vehicle 210 may detect the change of the road from a paved road to an unpaved road via one of the sensor systems described above, and may actuate a discharge valve of the dust box to an open position to discharge the dust from the air filter and dust box onto the section of unpaved road.

A collection of infrastructure elements 230 is shown is shown in FIG. 2. The collection of infrastructure elements 230 may comprise multiple elements of infrastructure 238, 240, and 242. In one example, the elements of infrastructure 238, 240, and 242 include a light pole with one or more environmental sensors and/or one or more cameras attached to the light pole that yield data on ambient conditions (e.g., weather, smog, air quality, etc.). In still another example, the elements of infrastructure 238, 240, and 242 may include other structures (e.g., buildings, telephone poles, bridges, etc.), upon which cameras, air quality sensors, etc. are attached.

In one example, one or more of the infrastructure elements 230 may be coupled to a control system 232. A wireless communication device 234 may be coupled to the control system 212 of one or more of the infrastructure elements 230. The controllers of the infrastructure elements 230 may communicate with each other and with the on-board controller in vehicle 210 via their respective wireless communication devices 252, and/or via other forms of vehicle to infrastructure technology (V2X). The elements of infrastructure 238, 240, and 242 of the infrastructure elements 230 may also communicate with the network cloud 260 via wireless communication 250.

For example, the vehicle 210 may communicate, via the wireless communication device 252, with one or more infrastructure elements 230, using one or more forms of vehicle to infrastructure technology (V2X), to receive ambient condition information. In one example, the infrastructure element is a light pole with one or more environmental sensors and/or one or more cameras attached to the light pole that yield data on ambient conditions, and the controller 214 detects operation of the vehicle on an unpaved road and/or dusty environment by detecting dust in an image taken by one of the one or more cameras of the light pole. In another example, the controller 214 detects operation of the vehicle on an unpaved road and/or dusty environment by retrieving air quality data from an air quality sensor of the light pole that estimates a large amount of particulate matter in the air. Detection of an unpaved road may be a precondition for performing an EVAP system routine, such as the dust box cleanout routine described in greater detail below in relation to FIGS. 6 and 7.

In this way, the vehicle 210 may communicate with remote sources (external network cloud, other vehicles, elements of infrastructure) using one or multiple technologies e.g., wireless communication, navigation system, V2V and/or V2X. Various kinds of data (such as ambient temperature, air quality conditions) may be exchanged among the vehicles and the network cloud and this data may be utilized for vehicle operation, for example, during a cleanout routine of an EVAP system of the vehicle.

Referring now to FIG. 3A, a cross section of an example CVS filter system 300 of an EVAP system of a vehicle is shown, where the CVS filter system 300 is housed within a dust box. The CVS filter system 300 may include a CVS 302 (e.g., the CVS 172 of FIG. 1) positioned along a central axis 304. The CVS 302 may be fluidly coupled to a vapor canister 350 (e.g., the fuel vapor canister 104 of EVAP system 154 of FIG. 1). In one example, the CVS 302 is coupled to the vapor canister 350 via a coupling 345. In other examples, the CVS 302 may be coupled to the vapor canister 350 via a conduit (not shown in FIG. 3A), whereby the CVS 302 is not proximate the vapor canister 350.

The CVS filter system 300 may be positioned within a cylindrical air filter 314 coaxially aligned with the CVS 302 around the central axis 304, the air filter 314 enclosing the CVS 302. The CVS 302 and the air filter 314 may be housed within a dust box 328. In one example, the dust box 328 is a molded housing that completely encloses the CVS 302 and the air filter 314. Fresh air from the atmosphere may enter the dust box 328 via an inlet 360, and may flow through the cylindrical air filter 314 to the CVS 302, whereby air entering the CVS 302 is filtered by the cylindrical air filter 314. In this way, dust from the air may be blocked from entering the EVAP system via the CVS 302, thereby reducing foreign contamination and/or leaks in one or more downstream purge valves, vapor blocking valves, CVS, etc.

Referring briefly to FIG. 3B, a simplified side view 380 of the CVS filter system 300 is shown, where the cross section of the CVS filter system 300 shown in FIG. 3A is rotated 90 degrees clockwise around a vertical axis as indicated by arrow 382. Side view 380 shows an offset position of the inlet 360 within the dust box 328, whereby fresh air may enter the dust box 328 via the inlet 360 at a position located external to the air filter 314. In this way, fresh air that enters the CVS filter system 300 via the inlet 360 may circulate within the dust box 328 around the exterior of the cylindrical air filter 314, and may filter through the cylindrical air filter 314 at any point on the exterior of the cylindrical air filter 314 to enter the CVS 302, as shown by the arrows 384. The filtered air may enter the CVS 302 via a plurality of air passages, such as air passages 310 and 311 of FIG.

Returning now to FIG. 3A, the CVS 302 may be actuated by a controller of the vehicle (e.g., the controller 214 of FIG. 2) to an open position, whereby air may pass through the CVS 302, or to a closed position, whereby air may not pass through the CVS 302. In one example, the CVS 302 may be a solenoid valve, where a plunger 324 is electromechanically actuated to move bidirectionally along the central axis 304. The CVS 302 may be a normally open valve, whereby a spring 322 may hold the plunger 324 in a first, open position. In the first, open position, a seal 308 is not pressed against the housing 312, and the air passages 310 and 311 are open, allowing air to pass through the CVS 302. When the CVS 302 is actuated to a closed position, the plunger 324 may be moved along the central axis 304, in a direction indicated by arrow 306, to a second, closed position. In the second, closed position, a seal 308 is pressed against a housing 312 of the CVS 302, thereby closing air passages 310 and 311, and blocking air from passing through the CVS 302.

Dust in the fresh air that enters the dust box 328 via the inlet 360 may accumulate within the dust box 328, and on an outer perimeter surface 326 of the cylindrical air filter 314. By a force of gravity, the dust that accumulates in the dust box 328 may fall into a dust box reservoir 316 arranged at a lower end of the dust box 328. Additionally, dust that accumulates on the outer perimeter surface 326 of the cylindrical air filter 314 may be periodically dislodged from the outer perimeter surface 326 over time and/or as a result of vibrations in the EVAP system during operation of the vehicle, and may fall into the dust box reservoir 316.

Figure 4:
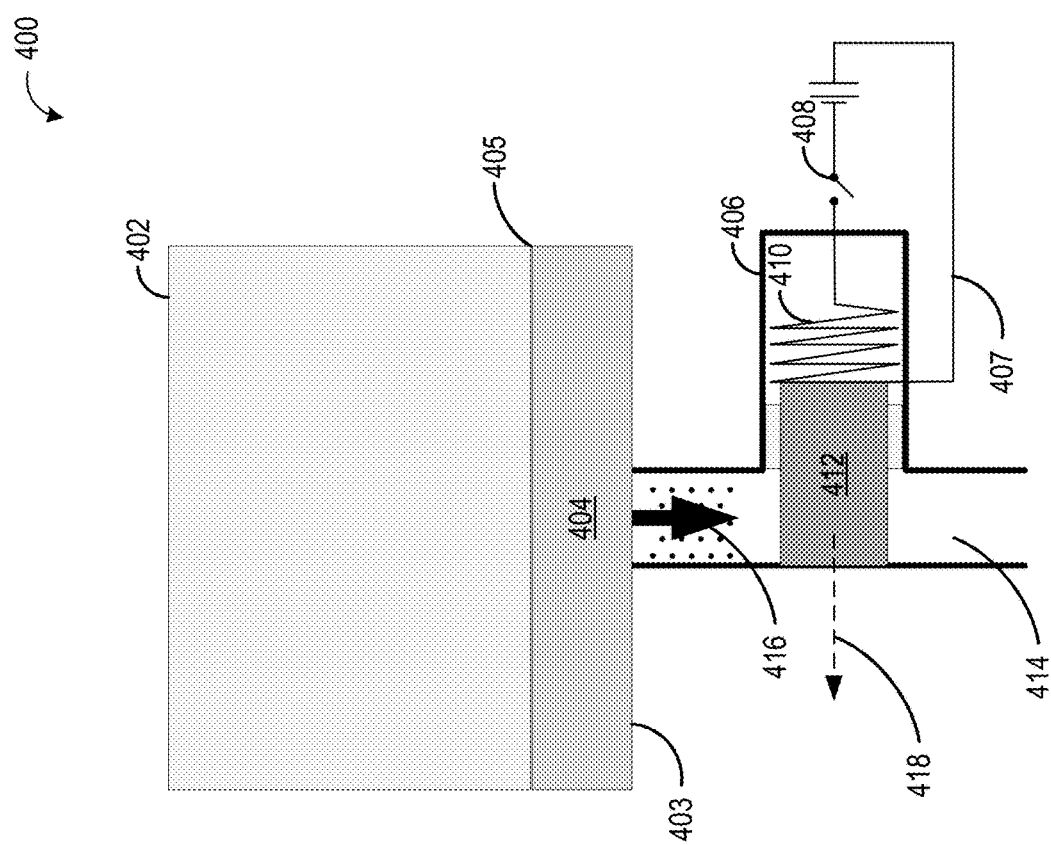
FIG. 4 shows an example discharge valve mechanism for a dust box in a closed position.

When the vehicle is operating in a dusty environment, the dust box reservoir 316 may become overwhelmed with dust. In one example, dust accumulated in the dust box 328 may reach a threshold level beyond which further dust accumulation may be hindered. To clear out the dust box, the dust box reservoir 316 may include a discharge valve 318, which may be actuated by the controller of the vehicle to an open position to discharge an accumulation of dust 320 from the dust box reservoir 316 into the environment. In one example, the discharge valve 316 is a solenoid valve. Details of operation of the discharge valve 318 is shown in FIGS. 4-5. In one example, the dust 320 is discharged via a cleanout routine such as the dust box cleanout routine described in method 700 of FIG. 7 and method 800 of FIG. 8.

In one example, air may flow through the CVS 302 in two directions. Fresh air entering the CVS filter system 300 via the inlet 360 may be directed through the vapor canister 350 during a vapor purge routine, as indicated by the solid arrows 340. In contrast, air from the EVAP system may be directed through the CVS 302 in an opposite direction, as indicated by the dashed arrows 330, for example, to discharge dust from the dust box during the dust box cleanout routine.

For example, during a first mode of operation (e.g., a canister purge mode), fresh air may enter the CVS filter system 300 via the inlet 360 positioned outside the cylindrical air filter. The fresh air may pass from outside the cylindrical air filter 314 to the interior of the cylindrical air filter 314 (e.g., through the air filter), flowing through the air passages 310 and 311 and the spring 322 to exit the CVS filter system 300 to the canister 350, as indicated by the arrows 340. The flow of air during the first mode of operation may purge fumes captured in the vapor canister 350 to an engine intake of the vehicle. During a second mode of operation (e.g., a dust discharge mode), air from the EVAP system may flow into the CVS filter system 300 through the spring 322 and the air passages 310 and 311 to the interior of the cylindrical air filter 314, where the air may pass through the cylindrical air filter 314 to the exterior of the cylindrical air filter 314. As air flows through the air filter, dust that accumulates on the outer perimeter surface 326 of the cylindrical air filter 314 during the first mode of operation, may be dislodged and released from the outer perimeter surface 326 of the cylindrical air filter 314 into the dust box 328 and/or out the discharge valve 318 to the environment during the second mode of operation.

In one example, the flow of air from the EVAP system through the CVS 302 during the second mode of operation as indicated by the arrows 330 (e.g., the dust discharge mode) is generated by a positive pressure of the EVAP system. For example, as part of the dust box discharge routine, the controller of the vehicle may turn off purge control and seal the EVAP system in anticipation of a discharge of the dust box reservoir 316 on an unpaved road of a route of the vehicle. When the EVAP system is sealed, a pressure may build up in the EVAP system as a temperature of the EVAP system increases (e.g., due to operation of an engine of the vehicle). When the controller determines that the vehicle has reached a suitable location for discharging the dust 320 from the dust box reservoir 316, the controller may initiate the second mode of operation of the CVS filter system 300, whereby the CVS 302 is actuated to an open position and the dust box discharge valve 318 is actuated to an open position, thereby allowing air from the EVAP system to flow through the CVS 302 in the direction indicated by the arrows 330. The air from the EVAP system may flow through the cylindrical air filter 314 from the interior of the cylindrical air filter 314 to the exterior of the cylindrical air filter 314, thereby dislodging dust from the outer perimeter surface 326 of the cylindrical air filter 314. The dislodged dust may be expelled from the outer perimeter surface 326 of the cylindrical air filter 314 to an interior surface 332 of the dust box 328, where it may be directed down one or more sides of the dust box 328 to the dust box reservoir 316. The controller may open the dust discharge valve 318, whereby the dust 320 from the dust box reservoir 316 may be discharged into the atmosphere. At the end of the dust box discharge routine, the controller may actuate the dust discharge valve 318 to a closed position and actuate the CVS 302 to a closed position, and purge control may be turned on to resume purging of the vapor canister. In this way, dust that accumulates in the dust box 328, on the cylindrical air filter 314, and in the dust box 328 may be periodically cleaned out, thereby maintaining an efficiency of the EVAP system and the purge control routine.

Referring now to FIG. 4, an example discharge valve mechanism 400 is shown for a dust box of a CVS filter system of an EVAP system of a vehicle, where the discharge valve mechanism 400 is in a closed position. The CVS filter system may be the same as or similar to the CVS filter system 300 of FIG. 3. The discharge valve mechanism 400 may be actuated to discharge an accumulation of dust 404, which may collect in a reservoir 403 of dust box 402 (e.g., the dust box reservoir 316 of FIG. 3), up to a dust level 405. For example, if the vehicle operates regularly in dusty conditions and/or on dirt roads, a large amount of dust may enter the CVS filter system and the dust level 405 may be high, while if the vehicle operates primarily on paved roads and in urban environments, less dust may enter the CVS filter system and the dust level 405 may be low.

In one example, the discharge valve mechanism 400 is a normally closed solenoid valve arranged on a vent line 414 leading out of the dust box 402, where the discharge valve mechanism 400 is in a closed position when the solenoid is not actuated, and where the solenoid may be actuated to open the discharge valve mechanism 400. The vent line 414 may provide an exit passage for the dust 404 to be discharged from the dust box 402, in a downward direction as indicated by arrow 416. In one example, the vent line 414 leads to an exterior of the vehicle, whereby the dust 404 is discharged directly into the environment.

The discharge valve mechanism 400 may include a plunger 412, housed within a housing 406. During operation of the vehicle when the dust box is not being cleaned, the plunger 412 may be in a first (e.g., closed) position where the plunger obstructs the vent line 414, whereby the dust 404 may be blocked from being discharged from the dust box 402. In order to maintain the plunger in the first position blocking the vent line 414, a switch 408 of a circuit 407 is maintained in an off position, thereby maintain the circuit 407 incomplete. As electricity does not pass through the incomplete circuit, the solenoid 410 is maintained de-energized and the spring loaded plunger 412 may be held in the first position. The plunger 412 may be maintained in the first position at all times except when the dust box is being cleaned.

FIG. 5 shows view 500 of the discharge valve mechanism 400 in an open position. When the controller actuates the discharge valve mechanism 400 to an open position, a circuit 407 may be closed via actuation of a switch 408, whereby an electric current is introduced into the solenoid 410 that surrounds the plunger 412. Current flow through the solenoid 410 may result in generation of an electromagnetic field at the solenoid causing the spring loaded plunger 412 to be retracted into the housing 406, thereby unblocking the vent line 414 and allowing the dust 404 to be released through the vent line 414. The switch 408 of the circuit 407 is shown in a closed position, whereby the electric current introduced into the coil 410 surrounding the plunger 412 has caused the plunger 412 to fully retract into the housing 416, as indicated by the arrow 502, whereby the vent line 414 is opened and dust is discharged. In one example, the dust is discharged via an air flow generated by a pressure of the EVAP system, for example, due to a temperature increase of the EVAP system, as described above in relation to FIG. 3.

Referring now to FIG. 6, an exemplary method 600 is shown for a dust box cleanout routine, whereby dust from a dust box disposed around an air filter of a CVS (such as the CVS 172 of EVAP system 154 of FIG. 1 and/or the CVS 302 of FIG. 3) of a vehicle is selectively discharged at a suitable location. Instructions for carrying out method 600 and all other methods included herein may be executed by a controller (e.g., the controller 166 of control system 160 of FIG. 1) based on instructions stored on a memory of the controller and in conjunction with signals received from sensors of the vehicle propulsion system, such as the sensors described above with reference to FIG. 1. The controller may employ actuators of the vehicle propulsion system in accordance with the methods described below.

At 602, method 600 includes estimating and/or measuring vehicle operating conditions. Vehicle operating conditions may be estimated based on one or more outputs of various sensors of the vehicle, such as the sensors described above with reference to FIG. 1. Vehicle operating conditions may include engine speed and load, vehicle speed, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor speed, battery charge, engine torque output, vehicle wheel torque, etc. In one example, the vehicle is a hybrid electric vehicle, and estimating and/or measuring vehicle operating conditions includes determining whether the vehicle is being powered by an engine or an electric motor. Estimating and/or measuring vehicle operating conditions may further include determining a state of a fuel system of the vehicle, such as a level of fuel in the fuel tank, determining a state of one or more valves of the fuel system (e.g., a canister vent valve, fuel tank intake valve, canister purge valve, etc.).

At 604, method 600 includes determining whether a dirt road is anticipated on a route of the vehicle, as a discharge location for discharging the dust box. As one example, an operator of the vehicle may use an onboard navigation system of the vehicle to plan a route via a GPS-enabled map, and a controller of the vehicle may determine that the planned route of the vehicle includes a road that is identified as an unpaved road. In other examples, the operator of the vehicle may not use an onboard navigation system to plan a route, but the operator may be traveling along a route with limited options, where the limited options include a route on a dirt road. For example, the vehicle may be operating on a country road with no intersections, where the controller may determine via an onboard navigation system that an upcoming section of the road is unpaved, or the vehicle may be traveling on a road that leads to a single destination where the approach to the destination includes an unpaved road, such as a campsite. In some examples, the controller may determine from images taken by an onboard camera that the vehicle may be traveling on an unpaved road. For example, when in a stopped state on a dirt road, a camera mounted on a rear side of the vehicle may generate an image of the road behind the vehicle in a clear state, where the road is shown in detail. After accelerating, the camera may generate an image of the road behind the vehicle where the road is not shown in detail, and the image appears hazy. The controller may infer from the hazy image that a dust cloud is present behind the vehicle, and as a result, the controller may further infer that the vehicle is operating on a dirt road.

In other examples, the controller may communicate with one or more vehicles via a vehicle to vehicle (V2V) network among other on road vehicles to determine whether a dirt road is anticipated on a route on which the vehicle is being operated. For example, a first vehicle may be traveling on a highway that is under construction, where a section of the highway is temporarily unpaved due to the construction. The onboard navigation system may not be activated, or the onboard navigation system may not be notified of the construction and may mistakenly display the route as a paved road. A controller of the first vehicle may communicate via a V2V network with a controller of a second vehicle being operated on the highway, where the second vehicle is ahead of the first vehicle, whereby the controller of the second vehicle may inform the controller of the first vehicle that an upcoming section of the highway is unpaved.

A controller of the vehicle may also communicate with a V2X network to receive information from infrastructure elements arranged along a route of the vehicle about particular matter in the air along the route. For example, a light post located on an upcoming section of the route of the vehicle may have a traffic camera installed on it, where the controller of the vehicle may receive one or more images from the traffic camera prior to reaching the upcoming section of the route. The controller may determine from the one or more images that the air around the light post includes a large amount of particular matter (e.g., dust), whereby the controller may infer that the road is a dirt road or that dusty conditions exist for a different reason.

If it is determined at 604 that a dirt road is not anticipated on the route on which the vehicle is operating, method 600 proceeds to 606. At 606, method 600 includes delaying until a dirt road is anticipated on the route, and method 600 proceeds back to 602. In some examples, the vehicle may be an autonomous vehicle where a controller of the vehicle may direct the autonomous vehicle to a dirt road, as described in greater detail below in reference to FIG. 8. If it is determined at 604 at a dirt road is anticipated on the route on which the vehicle is operating, method 600 proceeds to 608. At 608, a controller may determine whether a vapor canister load is below a threshold load (e.g., empty). For example, a vapor purge control routine of the vehicle may be running, whereby vapors of a fuel tank of the vehicle that are captured in the vapor canister are purged into an engine intake of the vehicle. The vapor purge control routine may allow vapors to build up in the vapor canister over a first duration, in order to purge them over a second duration. The controller may determine when the vapor purge control routine has completed a purge (e.g., at the end of the second duration), and may infer that the vapor canister has been purged, and therefore that a load of fuel vapors in the vapor canister is below a threshold load (e.g., 5% load). If it is determined that the vapor canister is above the threshold load (e.g., that the first duration and the second duration have not completed) method 600 proceeds to 609. At 609, method 600 includes delaying the dust box cleanout routine until the vapor canister is below the threshold load (e.g., empty), and method 600 proceeds back to 608. If it is determined at 608 that the vapor canister is below the threshold load, method 600 proceeds to 610.

At 610, method 600 includes turning the purge control system off and closing a canister purge valve (CPV) of the vehicle and the canister vent valve (CVS) in order to seal the EVAP system, whereby vapors captured in the vapor canister are not purged into the engine intake of the vehicle and fresh air does not enter the EVAP system via the CVS. In some examples, sealing the EVAP system may include closing a canister purge valve (e.g., the CPV 158 of FIG. 1). In some examples, sealing the EVAP system may include opening a fuel tank intake valve (e.g., the FTIV 192 of FIG. 1), whereby a fuel tank pressure transducer may measure a pressure of the EVAP system. In other examples a different pressure sensor of the EVAP system may be used to measure the pressure of the EVAP system, and the FTIV may not be opened.

As a result of sealing the EVAP system, a temperature of the EVAP system may increase over time as a temperature of the vehicle increases due to operation and/or as an ambient temperature increases over the course of the day. As a result of the increase in temperature, a pressure may build up in the EVAP system, which may be used in a subsequent step of the method to clear dust from the air filter. In one example, the CVS is closed for a threshold duration prior to discharging the dust box to generate a pressure in the EVAP system. As an example, the threshold duration may be in the range of 5 to 10 minutes.

At 612, method 600 may include turning on an active suspension system, whereby the controller of the vehicle may control the vertical movement of one or more wheels of the vehicle relative to the chassis. As a result of turning on the active suspension system, vibrations may be induced in the EVAP system that may cause the air filter of the CVS to vibrate. Vibrations in the air filter of the CVS may cause dust that has collected on the air filter to be released into the dust box. In some examples, the active suspension system may include one or more modes, where a mode of the active suspension system may be selected (e.g., based on vehicle operating conditions, operator preference, etc.) for example, the active suspension system may be turned on in a least dampening or sport mode, whereby a degree of control applied to the one or more wheels of the vehicle may be less than in other modes of the active suspension system. In other examples, a different mode may be selected where the degree of control applied to the one or more wheels of the vehicle may be more than in the least dampening or sport mode. In still other examples, the vehicle may not have an active suspension system, or the vehicle may have an active suspension system but the controller may not turn on the active suspension system. For example, the vehicle may be operating on a very smooth road in a dusty environment, whereby use of the active suspension system may negatively impact vehicle performance, or an operator of the vehicle may not use the active suspension system due to a personal preference.

At 614, method 600 includes discharging dust from the dust box. For example, discharging dust from the dust box may include opening a discharge valve of the dust box and allowing the dust to be discharged from the EVAP system due to a force of gravity. In other examples, discharging the dust from the dust box may include inducing a flow of pressurized air to facilitate expelling the dust from the air filter and/or purging the dust from the dust box. The discharging of dust from the dust box is described in greater detail below, in relation to FIG. 7.

In one example, method 600 may be performed in a single instance to discharge dust from the dust box. In other examples, method 600 may be performed in multiple instances, to maximize a discharge of dust from the dust box. For example, if an unpaved road is long, method 600 may be performed in a first instance, where an amount of dust is discharged from the dust box. After the dust is discharged from the dust box, method 600 may be performed in one or more additional instances, where each in instance of the one or more additional instances, an additional amount of dust is discharged from the dust box. In one example, discharging of the dust may be performed continually until the vehicle is no longer in a suitable location to discharge dust from the dust box (e.g., when the vehicle is no longer operating on an unpaved road). In another example, the method 600 may be repeated two or more times upon confirmation that the vehicle is operating on unpaved road and the canister is empty to ensure that the dust box can be cleaned.

Turning now to FIG. 7, an exemplary method 700 is shown for discharging dust from a dust box of an EVAP system (e.g., the EVAP system 154 of FIG. 1) of a vehicle during a dust box cleanout routine, such as the dust box cleanout routine described above in relation to method 600 of FIG. 6. Method 700 may be a part of method 600 and may be carried out at step 614 of FIG. 6.

At 702, method 700 includes opening a discharge valve of the dust box to discharge dust that has accumulated in the dust box during operation of the vehicle. For example, dust may enter the EVAP system of the vehicle when operating in dusty conditions and/or on dirt roads, via a canister vent valve (CVS) of the EVAP system during execution of a vapor purge control routine as described above. Dust entering the EVAP system via the CVS may accumulate on an air filter of the CVS Accumulated dust on the air filter may periodically detach and fall into a reservoir arranged under the dust box.

The discharge valve of the dust box may be opened and closed via a solenoid actuator, as described above in relation to FIGS. 3 and 4. For example, a controller of the vehicle may actuate a switch of an electrical circuit connected to a solenoid (such as solenoid 410 in FIG. 4) to a closed position to complete the electric circuit and energize the solenoid. An electromagnetic field generated at the solenoid may result in a plunger (such as plunger 412 in FIG. 4) being retracted from a vent line, thereby unblocking the vent line. Upon the vent being unblocked, a channel is open for the dust to be discharged into the environment. In one example, the dust is discharged directly to atmosphere via the discharge valve.

At 704, method 700 includes opening the CVS of the EVAP system. As described above in relation to method 700 of FIG. 7, a positive pressure may have built up within the EVAP system prior to discharging the dust box as a result of an increased temperature of the vehicle and/or an increased ambient temperature. By opening the CVS, a flow of air may be generated from the EVAP system through the air filter of the CVS to atmosphere due to the positive pressure of the EVAP system. As a result of the flow of air, particles of dust that have accumulated on the air filter may be expelled from the filter and may fall into the reservoir of the dust box, thereby partially unclogging the air filter of dust and increasing a breathability of the EVAP system.

Once the CVS has been opened, at 706, the controller may monitor the pressure of the EVAP system, for example, via a fuel tank pressure transducer arranged in the EVAP system (e.g., the FTPT 192 of FIG. 1). In one example, monitoring the pressure of the EVAP system may include measuring the pressure of the EVAP system at regular intervals (e.g., 1 second) as pressurized air is released from the EVAP system via the CVS, until the pressure of the EVAP system decays to atmosphere. At 708, method 700 includes determining whether the pressure of the EVAP system has reduced to atmospheric pressure (ATM). If it is determined that the pressure of the EVAP system is not at atmospheric pressure, method 700 proceeds to 712. At 712, method 700 includes delaying until the pressure of the EVAP system decays to atmosphere, and method 700 proceeds back to 708. Alternatively, if it is determined at 708 that the pressure of the EVAP system is at atmosphere, method 700 proceeds to 710. At 710, the controller may close the CVS. For example, the controller may infer from the pressure of the EVAP system being at atmosphere that the purging of the dust box has been completed, as the flow of air from the EVAP system through the CVS has stopped.

At 714, method 700 includes closing the discharge valve, thereby ending the dust box cleanout routine. In order to close the discharge valve, the controller may actuate the switch of the electrical circuit connected to the solenoid to an open position to discontinue the flow of current through the electric circuit and consequently de-energize the solenoid. In the absence of the electromagnetic field generated at the solenoid, the plunger may advance into the vent line, thereby blocking the vent line. As the vent line is blocked, dust may no longer exit the dust box via the discharge valve. In one example, the discharge valve is closed immediately after the closing the CVS at 710. In other examples, the discharge valve may be closed after a duration following the closing of the CVS at 710 (e.g., 30 seconds). In still other examples, the discharge valve may be closed upon a condition (such as end of vehicle travel on unpaved road) being met. For example, during operation on an unpaved road, the discharge valve may be closed upon detecting an end to the unpaved road (e.g., via an image taken by an onboard camera, or de-activation of an active suspension system).

For example, the vehicle may be operated during a first duration on dirt roads where a level of particulate matter in the air is high (e.g., a ranch vehicle). As a result, dust may accumulate on the air filter of the CVS and in reservoir of the dust box. The vehicle may subsequently be operated during a second duration in an urban environment, where roads are paved and the level of particulate matter in the air is low (e.g., during a trip into town). An operator of the vehicle may plan a route on an onboard navigation system of the vehicle that ends on a dirt road identified as such by the onboard navigation system. (e.g., on a trip home from town). As a result of receiving trip information involving a dirt road from the onboard navigation system, the controller of the vehicle may initiate a dust box cleanout routine, such as the dust box cleanout routine described in method 700 of FIG. 7. As the vehicle initiates operation during a third duration on the planned route, a temperature of the EVAP system may be low (e.g., as the vehicle has not warmed up). The controller may open the CVS and a CPV and close an FTIV of the fuel system (e.g., the FTIV 191 of FIG. 1), thereby creating an air flow through the EVAP system in a first direction from the CVS to an intake of an engine of the vehicle that purges fuel vapors from the vapor canister. After purging the vapor canister, the controller may turn the vapor canister purge control off, close the CVS and the CPV, and open the FTIV to seal the EVAP system. As the vehicle is operated during a third duration on the planned route, the temperature of the EVAP pressure may increase due to operation of the vehicle. As a result of the increase in temperature, pressure may build up in the EVAP system. As the vehicle enters the dirt road at the end of the route, the controller may determine from images taken by an onboard camera of the vehicle that the dirt road is a suitable location to discharge the dust box of the air filter (e.g., by identifying the dirt road in the images), and the controller may actuate a discharge valve of the dust box to an open position (e.g., via a solenoid actuator). When the discharge valve is open, the controller may open the CVS, thereby generating a flow of pressurized air back through the filter in a second direction (e.g., in an opposite direction from an air flow generated during the vapor canister purge described above). When the CVS is opened, the flow of pressurized air, along with a force of gravity, may forcefully discharge the dust in the dust box out through the discharge valve, thereby purging the dust box. Additionally, the flow of pressurized air may dislodge and release a portion of the dust particles accumulated on the air filter of the CVS out through the discharge valve, thereby facilitating an increased flow of air through the air filter during a subsequent vapor canister purge cycle. After the CVS is opened, the controller may monitor the pressure of the EVAP system as it decays to atmosphere during the dust box cleanout. When the controller measures atmospheric pressure in the EVAP system, the controller may infer that the dust box has been purged, and the CVS and the discharge valve may be closed, ending the dust box cleanout routine.

Referring now to FIG. 8, an exemplary method 800 is shown for routing an autonomous vehicle to a selected discharge site for discharging a dust box of an EVAP system of a vehicle during a dust box cleanout routine, such as the dust box cleanout routine described above in relation to method 600 of FIG. 6. The autonomous vehicle may be driven without any operator and/or passenger present within the vehicle. In one example, the selected discharge site is on a section of unpaved road, where dust may already be present in the environment and where a discharge of dust may not be viewed as a contaminant.

At 802, method 800 includes determining whether the vehicle is unoccupied. In one example, a controller of the vehicle may determine whether the vehicle is unoccupied based on ride information received, for example, from a ride hailing application. For example, the controller may determine that the vehicle is unoccupied if no rides have been requested from the ride hailing application, or the controller may determine that the vehicle is unoccupied if a ride has been requested, but a passenger has not been picked up by the autonomous vehicle. In another example, the controller may determine whether the vehicle is unoccupied via one or more sensors positioned in one or more seats of the vehicle (e.g., a weight sensor, temperature sensor, etc.). In still other examples, the controller may determine whether the vehicle is unoccupied based on a configuration of seatbelts, whereby a number of attached seatbelts may indicate a number of passengers of the vehicle, or via an onboard camera disposed in a cabin of the vehicle (e.g., on the dashboard), or via another method.

If it is determined at 802 that the vehicle is not unoccupied (e.g., that there are one or more passengers in the vehicle), the dust box cleanout routine is not performed, and method 800 proceeds to 803. At 803, method 800 includes continuing operation of the vehicle until a destination of the vehicle is reached. Alternatively, if it is determined at 802 that the vehicle is unoccupied (e.g., that there is no passenger in the vehicle), the dust box cleanout routine is performed, and method 800 proceeds to 804.

At 804, method 800 includes selecting a location of a dust discharge site. In one example, the dust discharge site is selected from one or more potential discharge sites. For example, the one or more potential discharge sites may include one or more unpaved roads within a threshold distance of the vehicle (e.g., 10 miles), where the one or more unpaved roads are identified from data retrieved from one or more onboard and remote sources (e.g., via a navigation system, V2V network, V2X network, remote server, etc.). In one example, the selected dust discharge site of the one or more potential discharge sites is an unpaved road that is closest to the vehicle. In another example, the selected dust discharge site is an unpaved road within a threshold distance (e.g., 5 miles) from a route to a destination of the vehicle (e.g., to pick up a passenger who has hailed a ride). In other examples, the selected dust discharge site may be an off-road area that is dusty or grassy within the threshold distance from the route of the vehicle. In still other examples, the selected dust discharge site may be a driveway or a garage where the vehicle is stored when not in operation (for example, if travel on unpaved roads is infrequent), if permission is granted by an operator or owner of the vehicle.

For example, determining the location of the closest dirt road to the vehicle may include retrieving data from one or more sources, estimating a route of the vehicle, and further determining whether the estimated route includes an unpaved road. If the estimated route includes more than one unpaved roads, determining the location of an unpaved road that is closest to the vehicle may include comparing a distance between the vehicle and the unpaved road.

At 806, method 800 includes receiving locations of potential discharge sites via an onboard navigation system. For example, the controller of the vehicle may determine, based on data received from a ride hailing application, that a route of the vehicle defined by a passenger via the ride hailing application includes a section of road that is indicated to be an unpaved road by a GPS mapping service accessed by the onboard navigation system. In one example, the controller may use information retrieved from the GPS mapping service via the onboard navigation system to determine the route of the vehicle, and may retrieve data about characteristics of the route (e.g., location of any unpaved sections, amount of particulate matter in the air, etc.) from a different remote service via a network cloud (e.g., the network cloud 260 of FIG. 2).

At 808, method 800 includes receiving potential locations of potential discharge sites via a V2V network. For example, as described above in relation to FIG. 2, the vehicle may be a first vehicle in wireless communication with a second vehicle at a location in the vicinity of the first vehicle and/or on a route of the first vehicle, via a wireless connection device of the first vehicle (e.g., the wireless connection device 252 of FIG. 2). In some examples, the second vehicle is ahead of the first vehicle (e.g., where the second vehicle is between the first vehicle and a destination of the first vehicle). In other examples, the second vehicle may not be on the route of the first vehicle, but may be in the vicinity of the first vehicle, whereby the first vehicle may adjust the route of the first vehicle to include the location of the second vehicle. The first vehicle may retrieve information from the second vehicle about road and/or air quality via a V2V network, whereby the second vehicle may communicate to the vehicle of method 800 that the route includes an unpaved section of road. The unpaved section of road may be registered by the first vehicle as a potential discharge site of the dust box of the first vehicle.

At 810, method 800 includes receiving potential locations of potential discharge sites from one or more elements of infrastructure via a V2X network. For example, the vehicle may be in wireless communication, via a wireless connection device of the vehicle, with an element of infrastructure of the one or more elements of infrastructure located along the route of the vehicle and ahead of the vehicle on the route, as described above in regard to step 808. In one example, the element of infrastructure is a light post that includes one or more sensors and/or one or more cameras, whereby data captured by the one or more sensors and/or images taken by the one or more cameras may be retrieved by the vehicle via the wireless connection device. In other examples, the element of infrastructure is another structure upon which one or more sensors and/or cameras are mounted. Based on the data received by the vehicle from the element of infrastructure, the controller may determine whether the location of the element of infrastructure may be a potential discharge site.

As one example, if the controller receives an image from the element of infrastructure where dust appears in the image (e.g., the image includes "fuzzy" areas where the image is not clear, etc.), the controller may determine that the element of infrastructure is located in a dusty environment, and may register the location of the element of infrastructure as a potential discharge site. Alternatively, if the controller receives an image from the element of infrastructure where dust does not appear in the image (e.g., the image does not include "fuzzy" areas where the image is not clear), the controller may determine that the element of infrastructure is not located in a dusty environment, and may not register the location of the element of infrastructure as a potential discharge site. Similarly, the controller may determine whether the location of the element of infrastructure is a potential discharge site based on sensor data from the element of infrastructure. For example, the element of infrastructure may include an air quality sensor, which may transmit data to the vehicle via the V2X network indicating that air at the location of the element of infrastructure includes a large amount of particulate matter, whereby it may be inferred that the element of infrastructure is located in a dusty environment, and therefore that the location of the element of infrastructure is a potential discharge site. Alternatively, an air quality sensor of the element of infrastructure may transmit data to the vehicle via the V2X network indicating that the air at the location of the element of infrastructure does not include a large amount of particulate matter, whereby it may be inferred that the element of infrastructure is not located in a dusty environment, and therefore that the location of the element of infrastructure is not a potential discharge site.

At 812, method 800 includes selecting the location of the dust discharge site from the potential discharge sites detected at steps 806, 808, and 810. In one example, the selected discharge site is the discharge site closest to the vehicle. For example, the controller may determine that a duration of operation of the vehicle prior to discharging the dust from the dust box is to be minimized, where navigating to the discharge site closest to the vehicle minimizes the duration of operation of the vehicle prior to discharging the dust from the dust box. In other examples, the selected discharge site may not be the discharge site closest to the vehicle, and the selected discharge site may be a potential discharge site that is convenient with respect to achieving a different objective of the controller. For example, the controller may be operating the vehicle on a route towards a maintenance location of the vehicle, and may select a discharge site located on the route towards the maintenance location. In other examples, a single potential discharge site may be determined, whereby the selected discharge site is the single potential discharge site. In still other examples, no potential discharge sites may be determined, whereby no unpaved roads and/or dusty environments are detected within a threshold distance of the location of the vehicle or a route of the vehicle, and therefore no discharge site is selected. It should be appreciated that the examples provided herein are for illustrative purposes, and other factors may be considered in selecting the discharge site without departing from the scope of this disclosure.

At 814, method 800 includes determining whether a discharge site of the potential discharge sites identified at steps 806, 808, and 810 is selected. If it is determined at 814 that no potential discharge sites are detected, method 800 proceeds to 818. At 818, method 800 includes determining whether a destination of the vehicle has been reached. If the destination of the vehicle has been reached at 818, method 800 ends. If the destination of the vehicle has not been reached at 818, method 800 proceeds to 820. At 820, method 800 includes continuing operation of the vehicle and delaying the dust box discharge routine until a discharge site is selected.

If it is determined at 814 that a discharge site has been selected, method 800 proceeds to 816. At 816, method 800 includes routing the vehicle to the selected discharge site. In this way, a self-driving vehicle may be routed to a discharge site (e.g., in an environment where dust is already present), where the controller may discharge a dust box of the vehicle (for example, as part of the dust box cleanout routine described in method 600 of FIG. 6).

Figure 9:
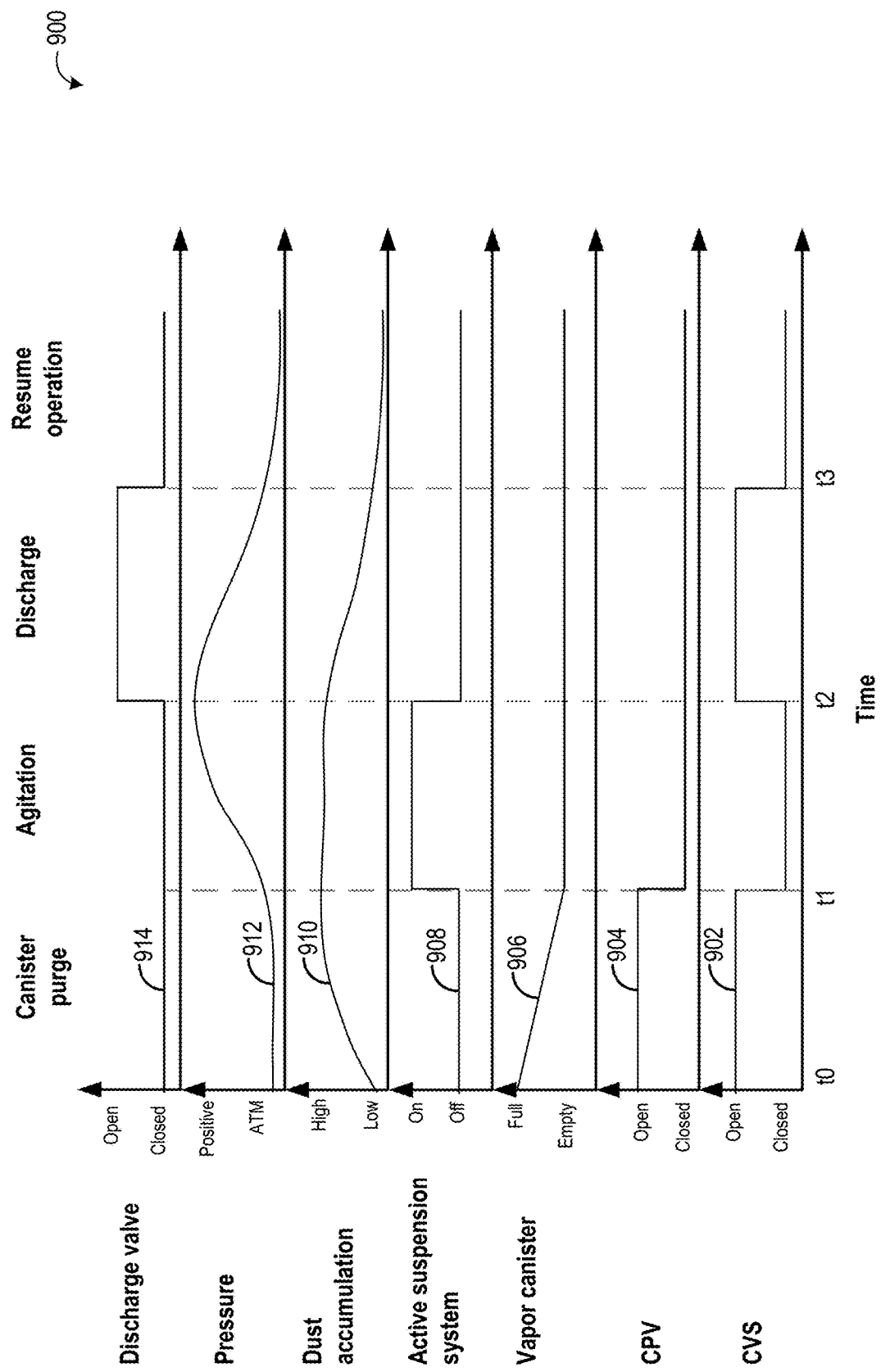
FIG. 9 is a timing diagram illustrating a timing of a dust box cleanout routine.

Referring now to FIG. 9, an operating sequence 900 is shown that illustrates an example cleanout routine for dust box of an air filter of an EVAP system of a vehicle (e.g., the EVAP system 154 of FIG. 1). In one example, the air filter is an air filter of a CVS valve, such as the CVS 172 of FIG. 1. The horizontal (x) axis denotes time and the vertical lines t1-t3 identify significant times in the operation of the purge routine.

The operating sequence 900 includes seven plots. The first plot, line 902, shows a position of a CVS housed in a vent line of the EVAP system. For example, when the CVS is open, air from the atmosphere is drawn into the vapor canister for purging fuel vapors during a purge routine, or when the CVS is closed, air from the atmosphere is not drawn into the vapor canister for purging fuel vapors during a purge routine. The second plot, line 904, shows a position of a CPV housed in a purge line of the EVAP system. For example, when the CPV is open, fuel vapors of the vapor canister are vented to an engine intake of the vehicle, or when the CPV is closed, fuel vapors of the vapor canister are not vented to the engine intake of the vehicle. The third plot, line 906, shows a state of the vapor canister. For example, the vapor canister may be full, whereby fuel vapors have collected in the vapor canister, or the vapor canister may be empty, whereby no fuel vapors have collected in the vapor canister. When the vapor canister is full, a vapor purge control system may open the CVS and the CPV to purge the vapors collected in the vapor canister into the engine intake. Alternatively, when the vapor canister is empty, it may be inferred that the vapor purge control system has purged the vapors collected in the vapor canister into the engine intake. The fourth plot, line 908, shows a state of an active suspension system of the vehicle. For example, the active suspension system may be on, whereby a controller of the vehicle (e.g., the controller 166 of control system 160 of FIG. 1) may control the vertical movement of one or more wheels of the vehicle relative to the chassis during operation of the vehicle, or the active suspension system may be off, whereby the controller does not control the vertical movement of one or more wheels of the vehicle relative to the chassis during operation of the vehicle. The fifth plot, line 910, shows an accumulation of dust in a filter system of the CVS. For example, the accumulation of dust may be low (e.g., if the vehicle is operating on paved roads), or the accumulation of dust may be high (e.g., if the vehicle is operating on dirt roads or in dusty environments). The sixth plot, line 912, shows a pressure of the EVAP system. For example, the pressure of the EVAP system may be positive (e.g., as a result of a temperature increase of the vehicle or ambient temperature), or the pressure of the EVAP system may be at atmospheric pressure (e.g., after a valve to atmosphere has been opened). Further, the pressure of the EVAP system may vary as a function of time and temperature, whereby the pressure may be higher (e.g., due to a large temperature increase of the vehicle or ambient temperature), or the pressure may be lower (e.g., due to a temperature increase of the vehicle or ambient temperature). In one example, the pressure of the EVAP system is measured via an FTPT positioned on a line of the EVAP system that connects the fuel tank to the vapor canister (e.g., the FTPT 192 on conduit 134 of FIG. 1). The seventh plot, line 914, shows a position of a discharge valve of the dust box. For example, the discharge valve of the dust box may be open, whereby dust accumulated in the dust box is discharged from the dust box, or the discharge valve of the dust box may be closed, whereby dust is not discharged and may continue to accumulate in the dust box.

At time t0, the vehicle is being operated, and purging the vapor canister via the vapor purge control routine is initiated. The EVAP system of the vehicle is configured such that the CVS is open, as shown by line 902, the CPV is open, as shown by line 904, and the vapor canister is full. Under this valve configuration the pressure of the EVAP system is at atmosphere, as shown by line 910.

Between time t0 and t1, the vapor purge control routine is executed. An engine vacuum caused by a spinning of the engine induces an air flow, whereby fresh air enters the EVAP system via the CVS and is drawn through the vapor canister and the CPV into the engine intake, thereby purging fuel vapors from the vapor canister. As a result of the air flow, the state of the vapor canister transitions from being full (e.g., of fuel vapors) to being empty, as shown by line 906. As air enters the CPV, dust in the air accumulates in the filter system of the CPV, as shown by line 910. For example, dust may accumulate on an air filter of the CPV, and/or dust may accumulate in a reservoir of a dust box of the CPV.

At time t1, the vapor canister is empty and the vapor purge control routine is completed. The CVS is closed, as shown by line 902, thereby blocking fresh air from entering the EVAP system. The CPV is also closed, as shown by line 904, thereby sealing the EVAP system. As result of operating in a dusty environment, an amount of dust accumulated in the filter system of the CVS is high, as shown by line 910.

Between time t1 and t2, as the vehicle continues to operate, a temperature of the EVAP system increases due to heat generated by the engine during operation. As a result of the temperature increase, the pressure of the EVAP system increases, as shown by line 912. As described above, the pressure may be measured by the FTPT sensor. In one example, an FTIV of the EVAP system positioned between the FTPT and the vapor canister is maintained in an open position, thereby exposing the FTPT to pressure changes in the vapor canister and portions of the EVAP system positioned between the CVS and the CPV (e.g., on the conduits 136 and 150 of EVAP system 154 of FIG. 1). For vehicles with an active suspension system, the active suspension system may be turned on, as indicated by line 908. As a result of turning on the active suspension system, vibrations may be induced in the EVAP system, which may agitate the air filter of the CVS, thereby loosening and/or releasing dust particles that have accumulated on the air filter into the reservoir of the dust box.

At time t2, purging of the dust box commences as the discharge valve is actuated to an open position, as shown by line 914. In one example, the discharge valve is actuated by a solenoid controlled by the controller, as described above in relation to FIGS. 4 and 5. Concurrently, the CVS valve is adjusted to an open position, as shown by line 902. In one example, the active suspension system may be turned off, as indicated by line 908. In other examples, the active suspension system may remain on during the discharge of dust from the dust box (e.g., between time t2 and t3). For example, the vibrations induced in the EVAP system by the active suspension system may result in more dust being dislodged from the air filter and discharged, whereby it may be desirable to allow the active suspension system to continue while an air flow is generated through the filter and until the dust box has been fully purged. From time t2 to t3, dust is discharged from the dust box into the environment, whereby the accumulation of dust in the filter system of the CVS decreases, as shown by line 910. As indicated by line 912, the pressure buildup in the EVAP system between t1 and t2 is released when the CVS is opened, thereby creating an air flow from the EVAP system back through the air filter (e.g., in the opposite direction as the air flow during the purging of the vapor canister). The force of the air flow may be proportional to the amount of pressure of the EVAP system prior to opening the CVS. For example, if the pressure is high, the force of the air flow may be high, and dust may be discharged from the dust box as a result of the air flow. Alternatively, if the pressure is low, the force of the air flow may be low, and dust may be discharged from the dust box partially as a result of the air flow and partially due to a force of gravity. If the pressure of the EVAP system is at atmosphere (e.g., due to a constant as opposed to increasing temperature of the EVAP system), no air flow may be generated through the air filter, and dust may be discharged from the dust box by the force of gravity.

At time t3, the CVS is actuated to a closed position, as shown by line 902, and the discharge valve is actuated to a closed position, as shown by line 914. The CVS is actuated to a closed position responsive to the pressure of the EVAP system decaying to atmospheric pressure, as shown by line 912, when the flow of air from the EVAP system through the CVS is no longer generated by a pressure difference between the EVAP system and the atmosphere.

In this way, dust that accumulates in the air filter and in the dust box of the CVS may be selectively discharged when appropriate road conditions are detected (e.g., a dirt road), and contamination of urban environments may be averted. The dust box cleanout routine may reduce an accumulation of dust on the filter and in the dust box, thereby maintaining an efficiency of the EVAP system and reducing emissions by increasing a flow of air for desorption, and reducing premature refueling system shut-offs of during refueling. The technical effect of cleaning out the air filter and the dust box of the CVS is that a restriction of the flow of air through the vapor canister during a vapor canister purge routine caused by dust may be reduced, thereby reducing foreign contamination and/or leaks in one or more downstream purge valves, vapor blocking valves, CVS, etc. An additional advantage of the dust box cleanout routine is that a capacity of the dust box and a size of the filter may be reduced, decreasing a cost of the EVAP system and providing additional design margin. Further, steps of the dust box cleanout routine may be initiated automatically based on feedback received from external systems via an onboard navigation system, a V2V network, a V2X network, as well as internal systems such as one or more onboard cameras or sensor systems of the vehicle, ABS, active suspension system, etc.

An example provides for a method for an engine of a vehicle, comprising, during travel on an unpaved road, selectively discharging a dust box housed in a vent line of an evaporative emissions control (EVAP) system by opening a discharge valve of the dust box leading to atmosphere. In a first example of the method, in a first, open position of the discharge valve, a channel from the dust box to the environment is unblocked; and in a second, closed position of the discharge valve, the channel from the dust box to the environment is blocked, the discharge valve of the dust box being a solenoid actuated valve. In a second example of the method, which optionally includes the first example, the method further comprises actuating a canister purge valve (CPV) coupled to a purge line of the EVAP system to a closed position to disable a purge control system of the vehicle prior to discharging the dust box. In a third example of the method, which optionally includes one or both of the first and second examples, the discharge valve is actuated to an open position upon confirmation that a load of a canister of the EVAP system is below a threshold level. In a fourth example, which optionally includes one or more of each of the first through third examples, the method further comprises closing a canister vent solenoid (CVS) coupled to the vent line of the EVAP system for a duration prior to discharging the dust box to generate a higher than a threshold pressure in the EVAP system, the threshold pressure higher than atmospheric pressure; opening the CVS while opening the discharge valve of the dust box to flow pressurized air from the EVAP system through the dust box during discharging; measuring a pressure of the EVAP system; and responsive to the measured pressure of the EVAP system decaying to atmospheric pressure, closing the CVS and the discharge valve of the dust box. In a fifth example, which optionally includes one or more of each of the first through fourth examples, the method further comprises activating an active suspension system of the vehicle for a duration prior to discharging the dust box to induce a vibration of an air filter arranged inside the dust box. In a sixth example, which optionally includes one or more of each of the first through fifth examples, the travel on the unpaved road is inferred by detecting dust in an image generated by an onboard camera of the vehicle upon acceleration of the vehicle. In a seventh example, which optionally includes one or more of each of the first through sixth examples, the vehicle is in wireless communication with one or more remote sources of data, and the unpaved road is detected via wireless communication with the one or more remote sources of data. In an eighth example, which optionally includes one or more of each of the first through seventh examples, the one or more remote sources of data include a global positioning system (GPS), a vehicle-to-vehicle (V2V) network, and/or a vehicle-to-infrastructure (V2X) network. In a ninth example, which optionally includes one or more of each of the first through eighth examples, the vehicle is a self-driving vehicle routed to travel to the unpaved road to discharge the dust box. In a tenth example, which optionally includes one or more of each of the first through ninth examples, the unpaved road is anticipated on a route of the vehicle prior to the vehicle reaching the unpaved road. In an eleventh example, which optionally includes one or more of each of the first through tenth examples, the anticipation of the unpaved road on the route of the vehicle comprises estimating a location of the vehicle; estimating a route of the vehicle; and in response to the unpaved road being on the estimated route of the vehicle, indicating that a dirt road is anticipated on the route of the vehicle. In a twelfth example, which optionally includes one or more of each of the first through eleventh examples, the discharge valve is maintained open until the vehicle is no longer operating on the unpaved road.

An example provides for a method for a vehicle, comprising, during a first condition, maintaining a solenoid actuated discharge valve of a dust box in a closed position; and during a second condition, opening the solenoid actuated discharge valve to expel dust from the dust box to atmosphere, the dust box coupled to a canister vent valve housed in a vent line of an evaporative emissions control system. In a first example of the method, the first condition includes one or more of the vehicle travelling on a paved road and a canister load above a threshold load, and the second condition includes each of the vehicle travelling on an unpaved road and the canister load reducing below the threshold load. In a second example of the method, which optionally includes the first method, the solenoid actuated discharge valve is actuated to an open position in response to reaching an unpaved road, and the solenoid actuated discharge valve is actuated closed in response to a pressure of the evaporative emissions control system reducing to atmospheric pressure. In a third example of the method, which optionally includes one or more of each of the first and second examples, prior to opening the solenoid actuated discharge valve, a canister vent valve and a canister purge valve of the evaporative emissions control system are actuated to a closed position to generate a higher than threshold pressure in the evaporative emissions control system, the threshold pressure being higher than atmospheric pressure. In a fourth example of the method, which optionally includes one or more of each of the first through third examples, upon opening of the discharge valve to expel the dust from the dust box, the canister vent valve is opened to route pressurized air from the evaporative emissions control system to atmosphere via an air filter of the dust box to dislodge dust from the air filter.

An example provides for a system of a vehicle, comprising a controller, storing instructions in non-transitory memory that, when executed, cause the controller to retrieve data from one or more sources to select an upcoming discharge location on a route of the vehicle; and in response to selecting a discharge location on a route of the vehicle, close a canister vent solenoid (CVS) housed in a vent line of an evaporative emissions control (EVAP) system of the vehicle; close a canister purge valve (CPV) housed in a purge line of the EVAP system of the vehicle; and in response to reaching the discharge location, actuate the CVS to an open position; actuate a discharge valve of a dust box to an open position to discharge the dust box; and upon a fuel system pressure reaching a threshold pressure, actuate the discharge valve of the dust box to a closed position. In a first example of the system, upon actuation of the discharge valve to an open position, the fuel system pressure is monitored by a fuel tank pressure sensor, and the threshold pressure corresponds to atmospheric pressure.

FIG. 3A shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for an engine of a vehicle, comprising:
during travel on an unpaved road, selectively discharging a dust box housed in a vent line of an evaporative emissions control (EVAP) system by opening a discharge valve of the dust box leading to atmosphere, wherein in a first, open position of the discharge valve, a channel from the dust box to the environment is unblocked, and in a second, closed position of the discharge valve, the channel from the dust box to the environment is blocked, the discharge valve of the dust box being a solenoid actuated valve, wherein the discharge valve is maintained open until the vehicle is no longer operating on the unpaved road.

2. The method of claim 1, further comprising actuating a canister purge valve (CPV) coupled to a purge line of the EVAP system to a closed position to disable a purge control system of the vehicle prior to discharging the dust box.

3. The method of claim 2, further comprising:
closing a canister vent solenoid (CVS) coupled to the vent line of the EVAP system for a duration prior to discharging the dust box to generate a higher than a threshold pressure in the EVAP system, the threshold pressure higher than atmospheric pressure;
opening the CVS while opening the discharge valve of the dust box to flow pressurized air from the EVAP system through the dust box during discharging;
measuring a pressure of the EVAP system; and
responsive to the measured pressure of the EVAP system decaying to atmospheric pressure, closing the CVS and the discharge valve of the dust box.

4. A method for an engine of a vehicle, comprising:
during travel on an unpaved road, selectively discharging a dust box housed in a vent line of an evaporative emissions control (EVAP) system by opening a discharge valve of the dust box leading to atmosphere; and
actuating a canister purge valve (CPV) coupled to a purge line of the EVAP system to a closed position to disable a purge control system of the vehicle prior to discharging the dust box, wherein the discharge valve is actuated to an open position upon confirmation that a load of a canister of the EVAP system is below a threshold level.

5. A method for an engine of a vehicle, comprising:
during travel on an unpaved road, selectively discharging a dust box housed in a vent line of an evaporative emissions control (EVAP) system by opening a discharge valve of the dust box leading to atmosphere; and
activating an active suspension system of the vehicle for a duration prior to discharging the dust box to induce a vibration of an air filter arranged inside the dust box.

6. A method for an engine of a vehicle, comprising:
during travel on an unpaved road, selectively discharging a dust box housed in a vent line of an evaporative emissions control (EVAP) system by opening a discharge valve of the dust box leading to atmosphere, wherein the travel on the unpaved road is inferred by detecting dust in an image generated by an onboard camera of the vehicle upon acceleration of the vehicle.

7. A method for an engine of a vehicle, comprising:
during travel on an unpaved road, selectively discharging a dust box housed in a vent line of an evaporative emissions control (EVAP) system by opening a discharge valve of the dust box leading to atmosphere, wherein the vehicle is in wireless communication with one or more remote sources of data, and the unpaved road is detected via wireless communication with the one or more remote sources of data.

8. The method of claim 7, wherein the one or more remote sources of data include a global positioning system (GPS), a vehicle-to-vehicle (V2V) network, and/or a vehicle-to-infrastructure (V2X) network.

9. The method of claim 7, wherein the vehicle is a self-driving vehicle routed to travel to the unpaved road to discharge the dust box.

10. The method of claim 7, wherein the unpaved road is anticipated on a route of the vehicle prior to the vehicle reaching the unpaved road.

11. The method of claim 10, wherein the anticipation of the unpaved road on the route of the vehicle comprises:
estimating a location of the vehicle;
estimating a route of the vehicle; and
in response to the unpaved road being on the estimated route of the vehicle, indicating that a dirt road is anticipated on the route of the vehicle.

12. A method for a vehicle, comprising:
during a first condition, maintaining a solenoid actuated discharge valve of a dust box in a closed position; and
during a second condition, opening the solenoid actuated discharge valve to expel dust from the dust box to atmosphere, the dust box coupled to a canister vent valve housed in a vent line of an evaporative emissions control system.

13. The method of claim 12, wherein the first condition includes one or more of the vehicle travelling on a paved road and a canister load above a threshold load, and wherein the second condition includes each of the vehicle travelling on an unpaved road and the canister load reducing below the threshold load.

14. The method of claim 12, wherein the solenoid actuated discharge valve is actuated to an open position in response to reaching an unpaved road, and wherein the solenoid actuated discharge valve is actuated closed in response to a pressure of the evaporative emissions control system reducing to atmospheric pressure.

15. The method of claim 12, wherein prior to opening the solenoid actuated discharge valve, a canister vent valve and a canister purge valve of the evaporative emissions control system are actuated to a closed position to generate a higher than threshold pressure in the evaporative emissions control system, the threshold pressure being higher than atmospheric pressure.

16. The method of claim 15, wherein upon opening of the discharge valve to expel the dust from the dust box, the canister vent valve is opened to route pressurized air from the evaporative emissions control system to atmosphere via an air filter of the dust box to dislodge dust from the air filter.

17. A system of a vehicle, comprising a controller, storing instructions in non-transitory memory that, when executed, cause the controller to:
retrieve data from one or more sources to select an upcoming discharge location on a route of the vehicle; and
in response to selecting a discharge location on a route of the vehicle:
close a canister vent solenoid (CVS) housed in a vent line of an evaporative emissions control (EVAP) system of the vehicle;
close a canister purge valve (CPV) housed in a purge line of the EVAP system of the vehicle; and
in response to reaching the discharge location,
actuate the CVS to an open position;
actuate a discharge valve of a dust box to an open position to discharge the dust box; and
upon a fuel system pressure reaching a threshold pressure, actuate the discharge valve of the dust box to a closed position.

18. The system of claim 17, wherein upon actuation of the discharge valve to an open position, the fuel system pressure is monitored by a fuel tank pressure sensor, and wherein the threshold pressure corresponds to atmospheric pressure.

* * * * *